United States Patent
Watanabe

[19]

[11] Patent Number: 5,913,565
[45] Date of Patent: Jun. 22, 1999

[54] VEHICLE MEMBER

[75] Inventor: Yoichi Watanabe, Yokohama, Japan

[73] Assignee: Nissan Motor, Yokohama, Japan

[21] Appl. No.: 08/717,922

[22] Filed: Sep. 23, 1996

[30] Foreign Application Priority Data

Sep. 22, 1995 [JP] Japan .................................. 7-224053

[51] Int. Cl.⁶ .................................................. B62D 25/08
[52] U.S. Cl. ...................... 296/189; 296/188; 296/203.02
[58] Field of Search .................................. 290/188, 189,
290/203.02, 203.04, 204, 194, 195, 205;
280/784, 785, 797, 798

[56] References Cited

U.S. PATENT DOCUMENTS

| | | | |
|---|---|---|---|
| 4,152,012 | 5/1979 | Reidelbach et al. ...................... | 280/784 |
| 4,406,343 | 9/1983 | Harasaki .................................. | 180/297 |
| 4,955,663 | 9/1990 | Imura ...................................... | 296/194 |
| 5,048,345 | 9/1991 | Hagiwara et al. ......................... | 73/788 |
| 5,244,248 | 9/1993 | Bovellan .................................. | 296/194 |
| 5,338,080 | 8/1994 | Janotik et al. ............................ | 296/29 |
| 5,409,289 | 4/1995 | Kalian et al. ............................ | 296/204 |
| 5,429,388 | 7/1995 | Wheatley et al. ....................... | 280/784 |

FOREIGN PATENT DOCUMENTS

| | | | |
|---|---|---|---|
| 39 09 388 | 9/1990 | Germany . | |
| 63-64883 | 3/1988 | Japan . | |
| 4-39172 | 2/1992 | Japan ..................................... | 296/188 |
| 4-50083 | 2/1992 | Japan ..................................... | 296/194 |

*Primary Examiner*—Dennis H. Pedder
*Attorney, Agent, or Firm*—Foley & Lardner

[57] ABSTRACT

An elongated vehicle member including a front portion having a first polygonal cross section with vertexes, a rear portion having a second polygonal cross section with less vertexes than the vertexes of the first polygonal cross section and connected to a vehicle body, and an intermediate portion connecting the front portion to the rear portion. The intermediate portion includes a transitional portion having a transitional surface for gradually changing a cross section from the first polygonal cross section to the second polygonal cross section. A reinforcement extends forward from the rear portion across the transitional surface to the front portion.

25 Claims, 22 Drawing Sheets

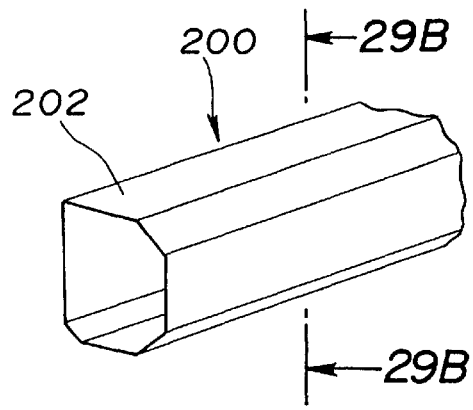
FIG. 29A
FIG. 29B
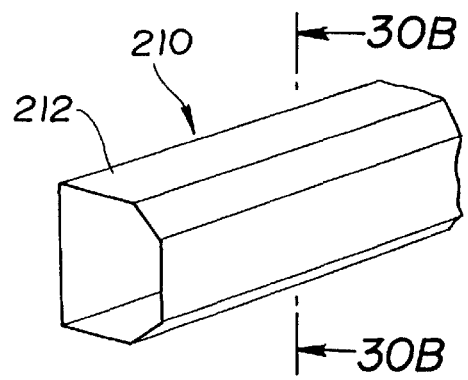
FIG. 30A
FIG. 30B
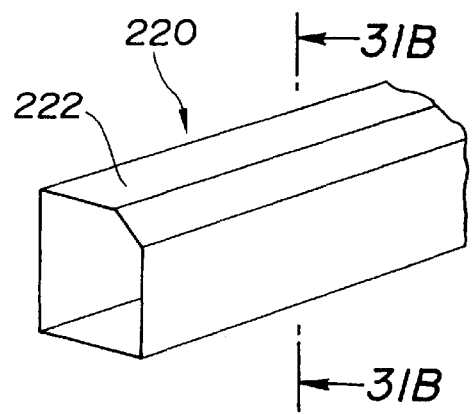
FIG. 31A
FIG. 31B

VEHICLE MEMBER

BACKGROUND OF THE INVENTION

The present invention relates to a vehicle member for use in a front end structure of a vehicle body.

Japanese Patent Application First Publication No. 63-64883 discloses a vehicle member of a front end structure of a vehicle body. The vehicle member includes spaced front side members extending in the fore-and-aft direction of the vehicle body, a floor member extending in the fore-and-aft direction of the vehicle body and connected to each of the front side members, and reinforcements disposed inside the front side member and the floor member and connected to each other. A gusset is secured to the connection of the reinforcements.

A related art is proposed in copending U.S. patent application Ser. No. 08/504,072 filed on Jul. 19, 1995, which copending application has been commonly assigned herewith.

SUMMARY OF THE INVENTION

An object of the present invention is to provide a vehicle member of a vehicle body which has a readily collapsible portion and assures a good energy absorption of the readily collapsible portion upon collision.

According to one aspect of the present invention, there is provided a vehicle member extending in fore-and-aft direction relative to a vehicle body, comprising:

- a first portion having a first polygonal cross section with vertexes, the first portion being so designed as to absorb energy;
- a second portion having a second polygonal cross section with less vertexes than the vertexes of the first polygonal cross section, the second portion connected to the vehicle body;
- an intermediate portion connecting the first portion to the second portion, the intermediate portion including means for gradually changing a cross section from the first polygonal cross section to the second polygonal cross section; and
- a reinforcement attached to at least one of the first, second, and intermediate portions;
- wherein the reinforcement is extended from the means for gradually changing to the first portion.

According to further aspect of the present invention, there is provided a front side member extending in fore-and-aft direction relative to a vehicle body, comprising:

- a first portion having a first polygonal cross section with vertexes, the first portion being so designed as to absorb energy caused by a compression force applied thereto in response to a front-end collision;
- a second portion having a second polygonal cross section with less vertexes than the vertexes of the first polygonal cross section, the second portion being connected to the vehicle body and so designed as to withstand the compression force;
- an intermediate portion connecting the first portion to the second portion, the intermediate portion including means for gradually changing a cross section from the first polygonal cross section to the second polygonal cross section; and
- a reinforcement attached to at least one of the first, second, and intermediate portions;
- wherein said reinforcement is extended from said means for gradually changing to the first portion.

According to still further aspect of the present invention, there is provided a front side member extending in fore-and-aft direction relative to a vehicle body, comprising:

- a first portion having a first polygonal cross section with vertexes, the first portion being corrugately deformable to absorb energy caused by a compression force applied thereto in response to a front-end collision;
- a second portion having a second polygonal cross section with less vertexes than the vertexes of the first polygonal cross section, the second portion being connected to one structure of the vehicle body and so designed as to transmit the compression force to other structure of the vehicle body;
- an intermediate portion connecting the first portion to the second portion, the intermediate portion including means for gradually changing a cross section from the first polygonal cross section to the second polygonal cross section; and
- a reinforcement covering at least one of the first, second, and intermediate portions, the reinforcement extending from the means for gradually changing to the first portion to promote the corrugate deformation of the first portion.

BRIEF DESCRIPTION OF THE DRAWINGS

FIG. 29A is a perspective view of a modified vehicle member;

FIG. 29B is a sectional view taken along line 29B—29B of FIG. 29A;

FIG. 30A is a perspective view of a further modified vehicle member;

FIG. 30B is a sectional view taken along line 30B—30B of FIG. 30A;

FIG. 31A is a perspective view of a still further modified vehicle member;

FIG. 31B is a sectional view taken along line 31B—31B of FIG. 31A;

DESCRIPTION OF THE PREFERRED EMBODIMENT

Figure 45:
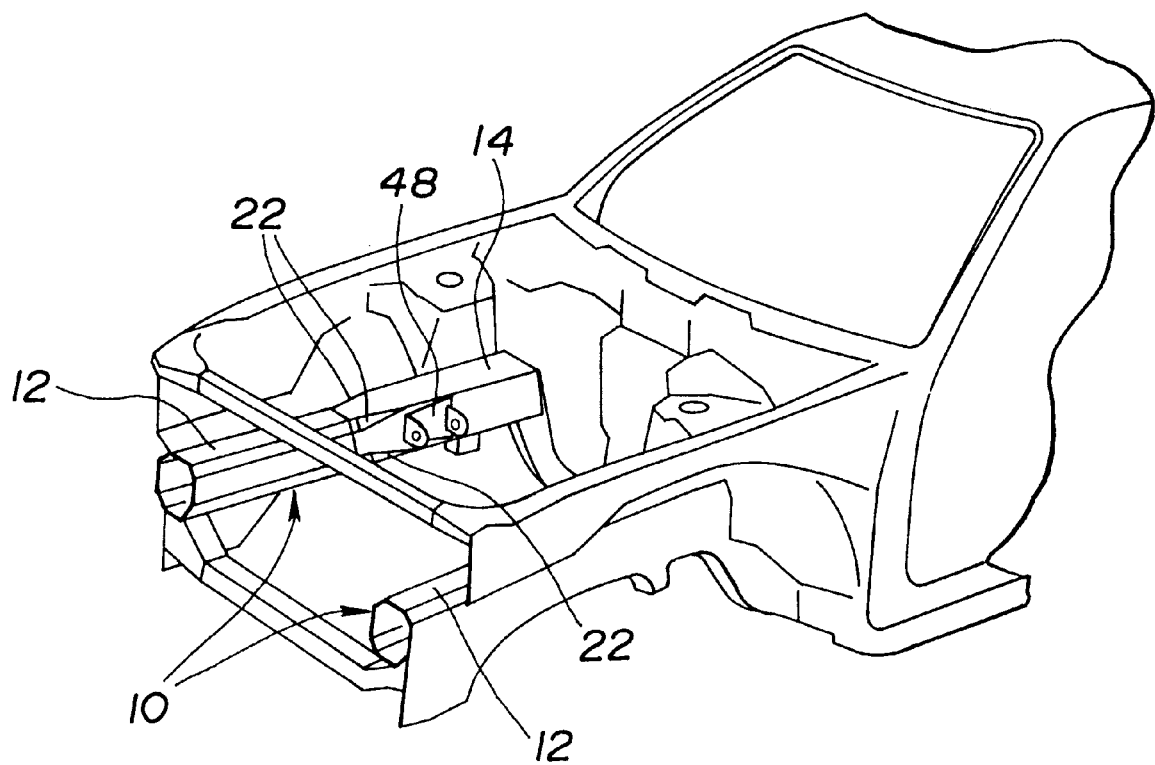
FIG. 45 is a schematic perspective view of a front end structure of a vehicle body.

Referring to FIGS. 1–5, a first preferred embodiment of an elongated vehicle member for use in a front end structure of a vehicle body will now be explained. For instance, the vehicle member 10 is mounted to the front end structure as shown in FIG. 45. The vehicle member 10 includes right and left members extending in the fore-and-aft direction relative to the vehicle body. The right and left members are substantially identical with each other and therefore solely one of the right and left members is explained hereinafter.

The vehicle member 10 includes a first portion 12 having a first polygonal cross section with vertexes. The first portion 12 is so designed as to absorb energy caused by a compression force applied thereto in a case, for instance, a front-end collision. The first portion 12 is corrugately deformable to absorb the energy caused by the compression force applied thereto in response to the front-end collision.

The vehicle member 10 includes a second portion 14 having a second polygonal cross section with less vertexes than the vertexes of the first polygonal cross section. The second portion 14 is connected to one structure of the vehicle body and so designed as to withstand the compression force and transmit the compression force to other structure of the vehicle body.

An intermediate portion 16 connects the first portion 12 to the second portion 14. The intermediate portion 16 includes a transitional portion 17 provided with at least one transitional surface 22 for gradually changing a cross section from the first polygonal cross section to the second polygonal cross section.

A reinforcement 40 is attached to at least one of the first, second, and intermediate portions 12, 14, and 16. The reinforcement 40 is extended from the transitional surface 22 to the first portion 12. The reinforcement 40 covers at least one of the first, second, and intermediate portions 12, 14, and 16 and extends from the transitional surface 22 to the first portion 12 to promote the corrugate deformation of the first portion 12.

Figure 1:
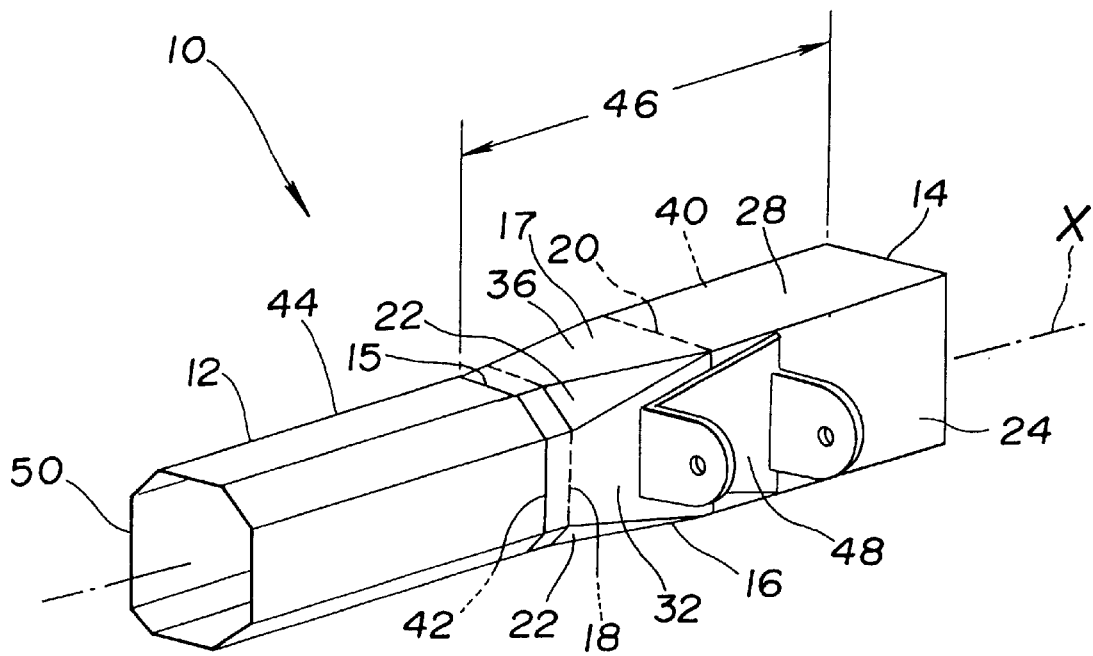
FIG. 1 is a perspective view of a vehicle member of a first embodiment according to the present invention.
Figure 2:
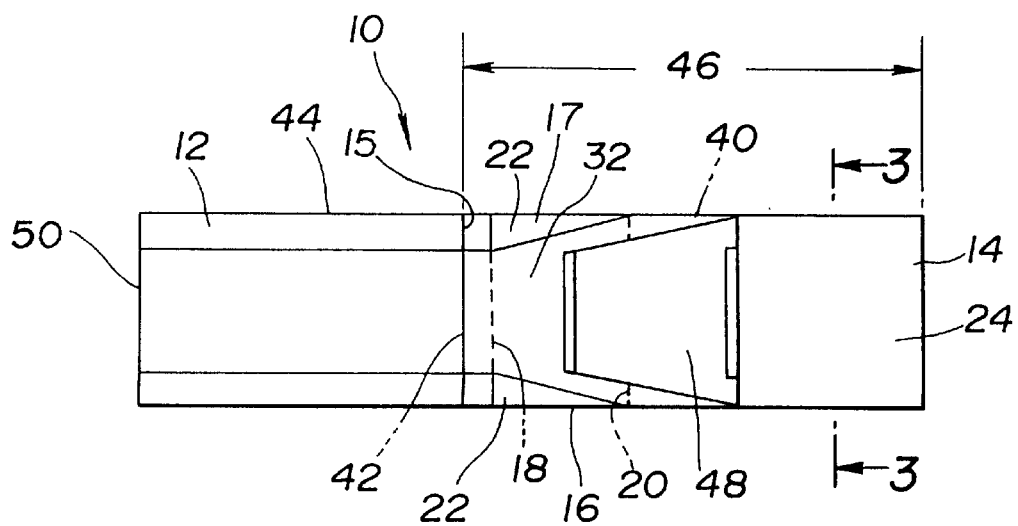
FIG. 2 is a side view of the vehicle member.

Specifically, as seen from FIGS. 1, 2, and 45, the vehicle member 10 is in the form of an elongated hollow column having a longitudinal axis X extending along the fore-and-aft direction of the vehicle body. The vehicle member 10 includes a front portion 12 as the first portion, a rear portion 14 as the second portion, and the intermediate portion 16 interposed between the front and rear portions 12 and 14. In this embodiment shown in FIG. 1, the rear portion 14 and the intermediate portion 16 are formed integrally with each other. The rear portion 14 and the intermediate portion 16 can be formed separately from each other and then coupled together. The front portion 12 is connected at a rear end 15 with the intermediate portion 16 in a suitable manner such as welding. The intermediate portion 16 includes one portion having same cross section as that of the front portion 12, and an opposite portion having same cross section as that of the rear portion 14. The transitional portion 17 of the intermediate portion 16 has a front end 18 indicated in a phantom line, having same cross section as that of the front portion 12, and a rear end 20 indicated in a phantom line, having same cross section as that of the rear portion 14.

The transitional portion 17 includes edges branched from the vertex of the rear portion to define the transitional surface 22. If a compression force or load axially applied to the front portion 12, the transitional surface 22 smoothly transmits the force to the rear portion 14, serving for preventing concentration of the compression force on a portion of the vehicle member 10. The transitional surface 22 coextends with an entire axial length of the transitional portion 17. The transitional surface 22 has one end disposed on the front end 18 of the transitional portion 17 and the other end disposed on the rear end 20 of the transitional portion 17. The one end of the transitional surface 22 is displaced axially rearward from the rear end 15 of the front portion 12.

Figure 3:
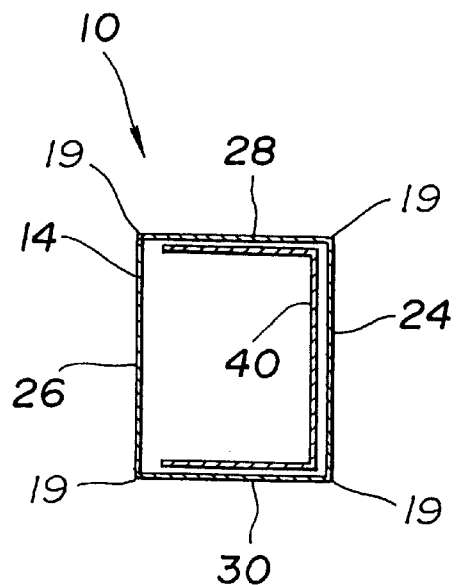
FIG. 3 is a sectional view taken along line 3—3 of FIG. 2.

In this embodiment, the cross section of the rear portion 14 is a tetragon with four vertexes 19 shown in FIG. 3, and the cross section of the front portion 12 is an octagon with eight vertexes. The transitional portion 17 of the intermediate portion 16 has the tetragonal cross section at the rear end 20 and the octagonal cross section at the front end 18.

Figure 4:
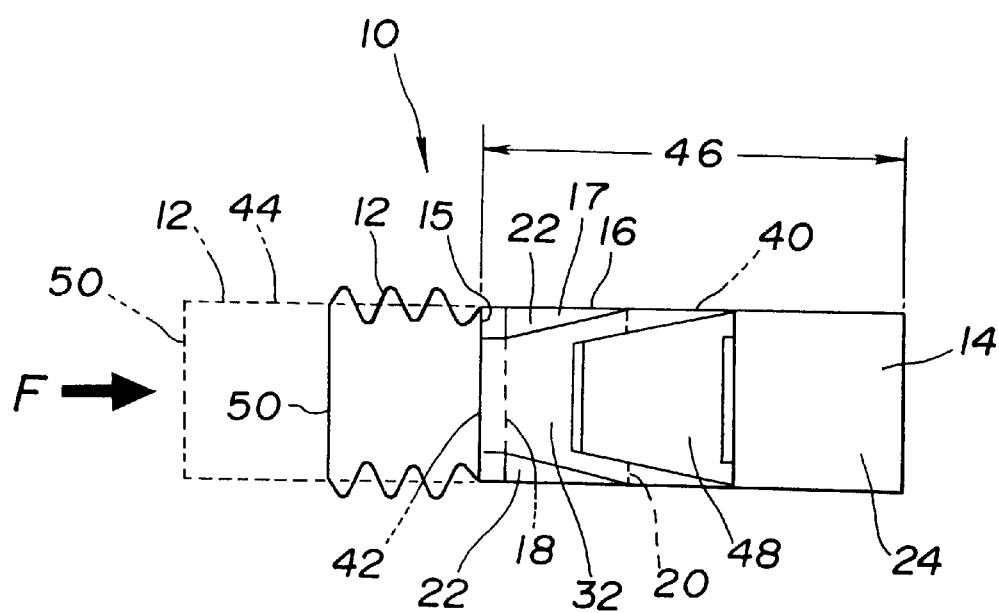
FIG. 4 is an explanatory diagram illustrating deformation of the vehicle member.

Specifically, as shown in FIGS. 1–3, the rear portion 14 includes two pairs of opposed walls of a rectangular shape, namely, inner and outer walls 24 and 26 and upper and lower walls 28 and 30. The transitional portion 17 includes two pairs of opposed walls, namely, inner wall 32 and outer wall and upper wall 36 and lower wall, of a trapezoidal shape. The transitional portion 17 has four transitional surfaces 22 respectively disposed between the adjacent two of the trapezoidal walls, two of which are illustrated in FIGS. 1, 2, and 4. Thus, the transitional surfaces 22 are circumferentially spaced from each other and axially aligned with each other. Each of the transitional surfaces 22 is a wall portion of a triangular shape defined by one of the four vertexes of the tetragonal cross section at the rear end 20 of the transitional portion 17 and the adjacent two of the eight vertexes of the octagonal cross section at the front end 18 of the transitional portion 17. The front end 18 and rear end 20 of the transitional portion 17 are positioned in respective vertical planes. Accordingly, front ends as the one end, of the four transitional surfaces 22 are axially aligned with each other as well as rear ends as the other end, thereof are.

In this embodiment, the reinforcement 40 extends from the rear portion 14 to the front portion 12 via the transitional surfaces 22 of the intermediate portion 16. The reinforcement 40 covers the entirety of the transitional surfaces 22. Specifically, the reinforcement 40 extended forward along inside the rear portion 14 and the intermediate portion 16 beyond the front end 18 of the transitional portion 17 to the rear end 15 of the front portion 12. The reinforcement 40 has one end, namely a front end 42 which is disposed beyond the front end of the transitional surface 22 aligned with the rear end 15 of the front portion 12. Thus, the reinforcement 40 defines a readily collapsible zone 44 at the front portion 12, which is uncovered with the reinforcement 40. A portion of the vehicle member 10 which is covered with the reinforcement 40 is indicated as range 46 in FIGS. 1, 2, and 4. Accordingly, the vehicle member 10 is provided with an increased collapsibility at the readily collapsible zone 44 at the front portion 12. In this embodiment, as illustrated in FIG. 3, the reinforcement 40 is formed of a channel-shaped cross section and disposed inside the vehicle member 10.

A bracket 48 is mounted to the inner walls 24 and 32 of the rear portion 14 and intermediate portion 16 of the vehicle member 10. Specifically, the bracket 48 is so disposed as to cover a portion of the rear end 20 of the transitional portion 17 which is located on the inner wall of the transitional portion 17. The bracket 48 has one end disposed on the inner wall of the transitional portion 17. For instance, the bracket 48 is provided for supporting a vehicle engine.

Referring to FIG. 4, deformation of the vehicle member 10 of the invention which is caused by a compression force applied to the front portion 12 in such an event as a front-end collision, is now explained. In FIG. 4, a normal non-deformed state of the front portion 12 is indicated in a broken line and a corrugately deformed state of the front portion 12 is indicated in a solid wavy line.

As illustrated in FIG. 4, when collision occurs and a compression force F is applied to a front end 50 of the front portion 12 along the axis X of the vehicle member 10, the readily collapsible zone 44 of the front portion 12 is buckleable and collapsible and corrugately deformable as indicated in the wavy line. In this condition, the portion of the vehicle member 10, including the rear portion 14 and the intermediate portion 16, which is covered with the reinforcement 40, is prevented from being easily deformed and collapsed. Further, since the reinforcement 40 covers the transitional surfaces 22 of the transitional portion 17, the vehicle member 10 is prevented from being buckled and collapsed at the transitional portion 17, specifically at the transitional surfaces 22, before occurrence of the buckling and collapse at the readily collapsible zone 44 of the front portion 12. Thus, this arrangement provides an increased collapsibility at the front portion 12 and enhances absorption of energy applied to the front portion in response to the front-end collision.

Figure 5:
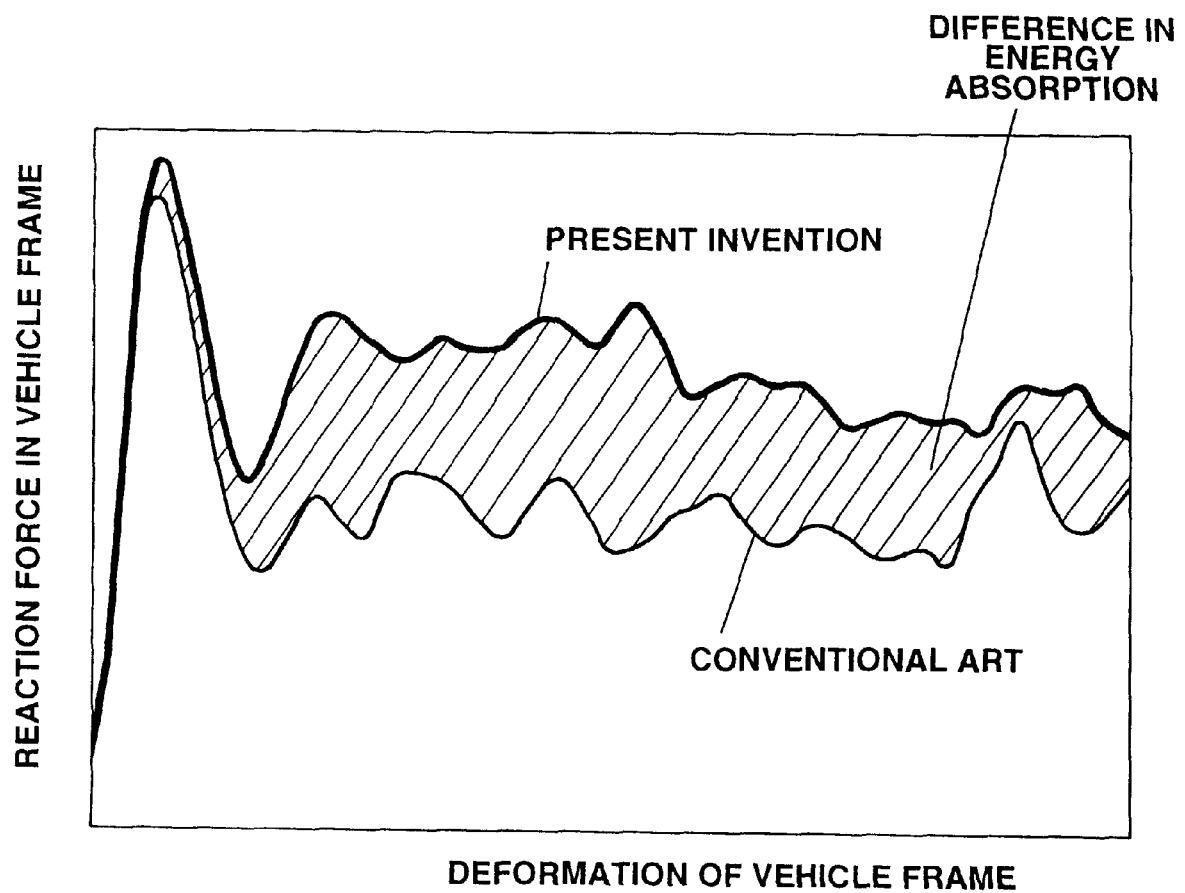
FIG. 5 is a diagram illustrating a difference in energy absorption between the vehicle member and a conventional art.

FIG. 5 shows respective collapse characteristics of the first preferred embodiment of the present invention and a conventional art which does not have such reinforcing structure as explained in the first embodiment. A difference in energy absorption between the first preferred embodiment and the conventional art is indicated by hatching. As seen from FIG. 5, the first preferred embodiment exhibits a greater energy absorption than the conventional art.

Figure 6:
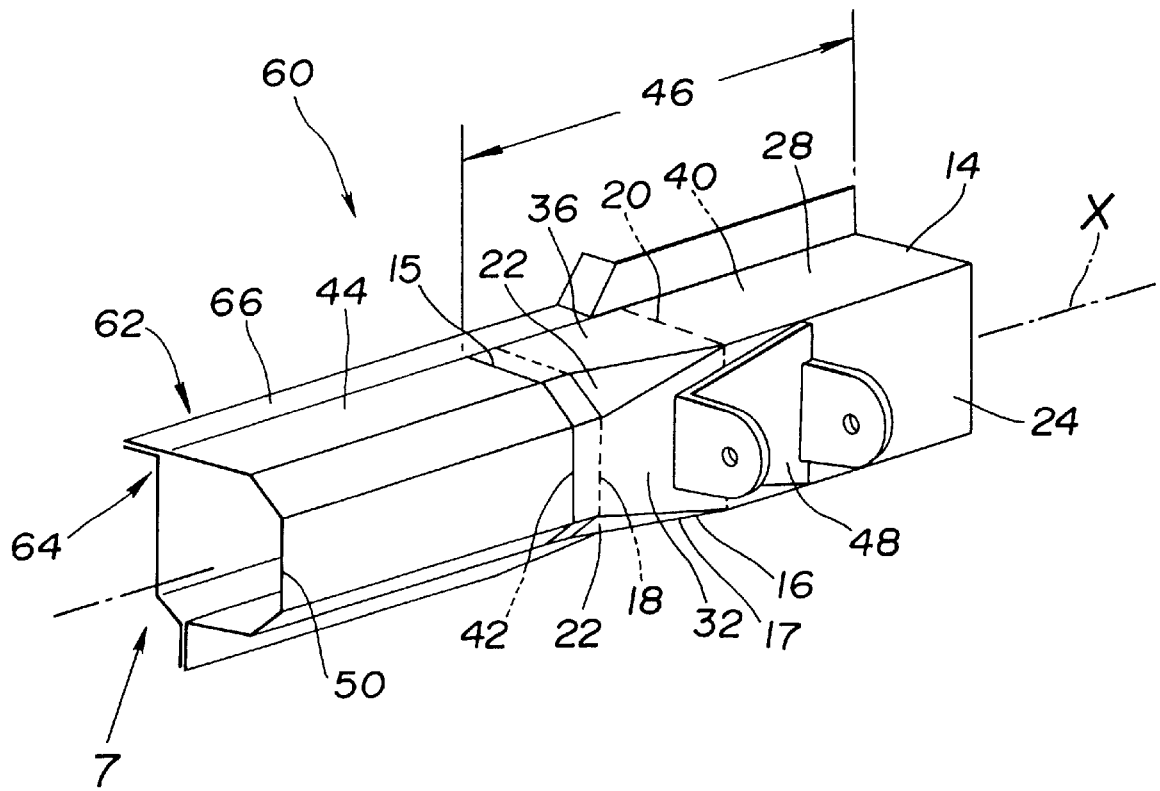
FIG. 6 is a perspective view of a vehicle member of a second embodiment.
Figure 7:
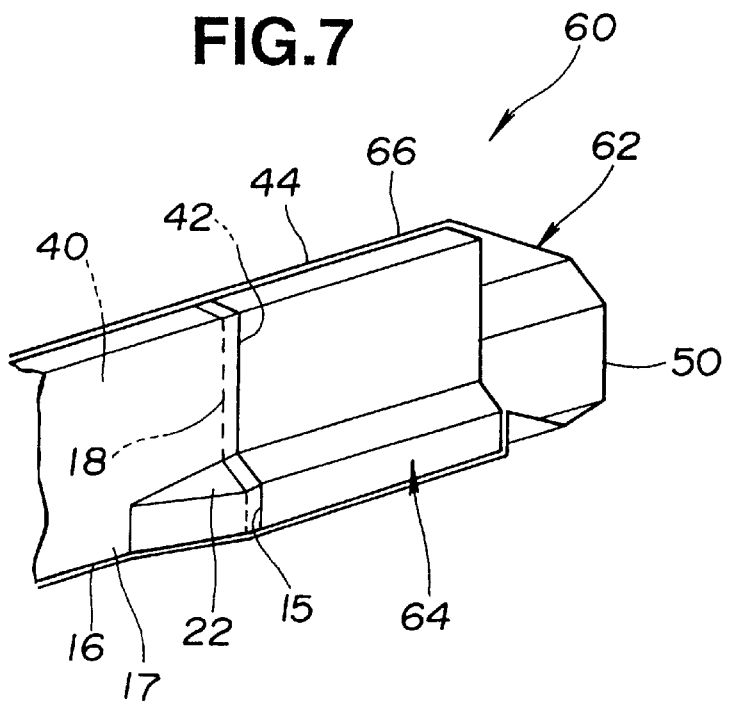
FIG. 7 is a fragmentary perspective view of the vehicle member of the second embodiment, as viewed from the bottom side and indicated by arrow 7 of FIG. 6.
Figure 8:
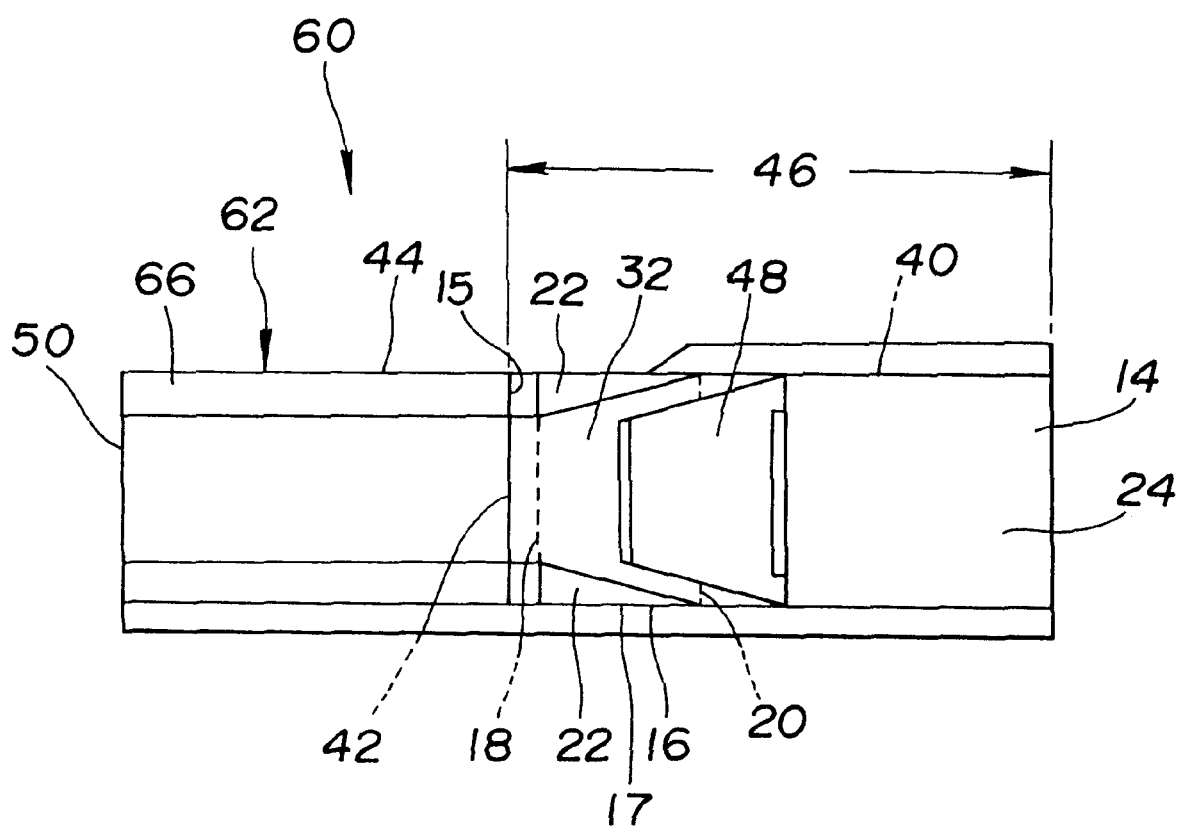
FIG. 8 is a side view of the vehicle member of FIG. 6.

Referring to FIG. 6–8, a second preferred embodiment of the invention will now be explained, which is similar to the first preferred embodiment except that an elongated vehicle member 60 is composed of two members 62 and 64 and has a heptagonal cross section at its front portion 68. Like reference numerals denote line parts and therefore detailed explanations therefor are omitted.

As illustrated in FIG. 6, the vehicle member 60 is composed of a generally channel-shaped member 62 defining a longitudinally extending side opening and a back plate 64 closing the side opening. The vehicle member 60 includes the front portion 68 having the heptagonal cross section, the rear portion 14 having the tetragonal cross section, and the intermediate portion 16 having the transitional portion 17 with three transitional surfaces 22. The three transitional surfaces 22 are inner upper and lower transitional surfaces as shown in FIGS. 6 and 8 and an outer lower transitional surface is shown in FIG. 7. As described in the first embodiment, the reinforcement 40 is so disposed as to extend over the transitional portion 17 with the three transitional surfaces 22 and beyond the front ends of the transitional surfaces 22 to the front portion 66. The reinforcement 40 has the front end 42 displaced axially forward from the front end of the transitional surface 22, defining the readily collapsible zone 44 at the front portion 66. Accordingly, this second embodiment provides an increased collapsibility at the readily collapsible zone 44 of the front portion 66 and exhibits an enhanced energy absorption upon collision, as well as the first embodiment.

Figure 9:
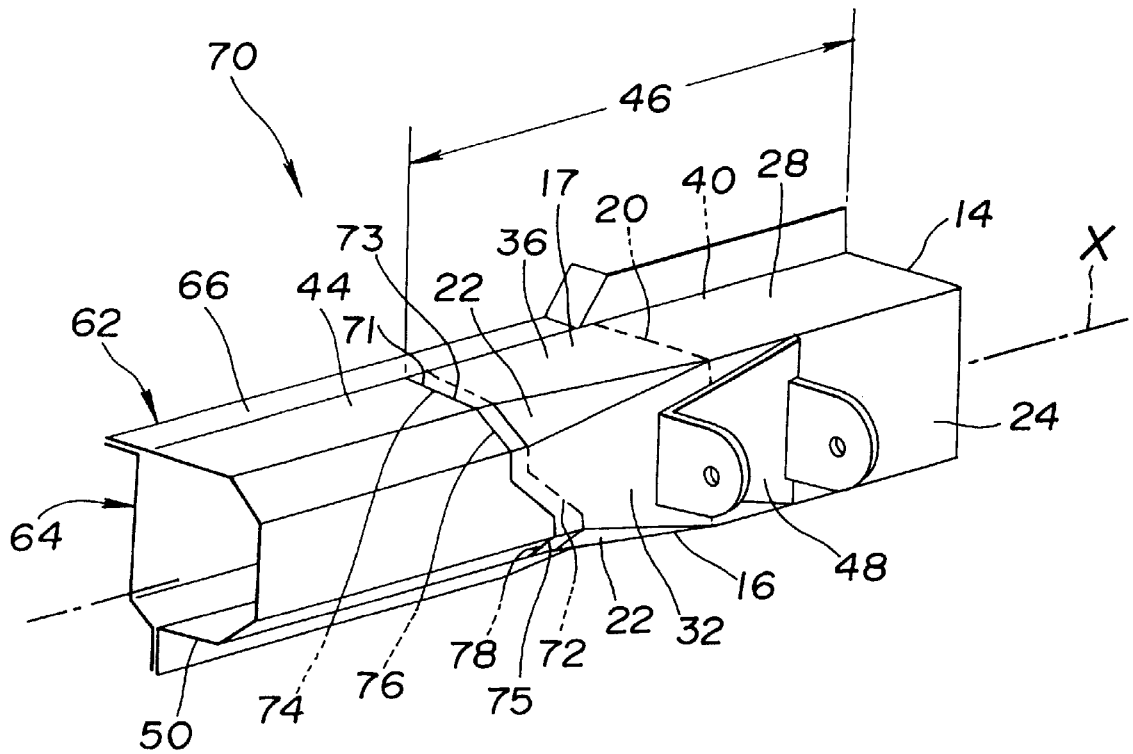
FIG. 9 is a perspective view of a vehicle member of a third embodiment.
Figure 10:
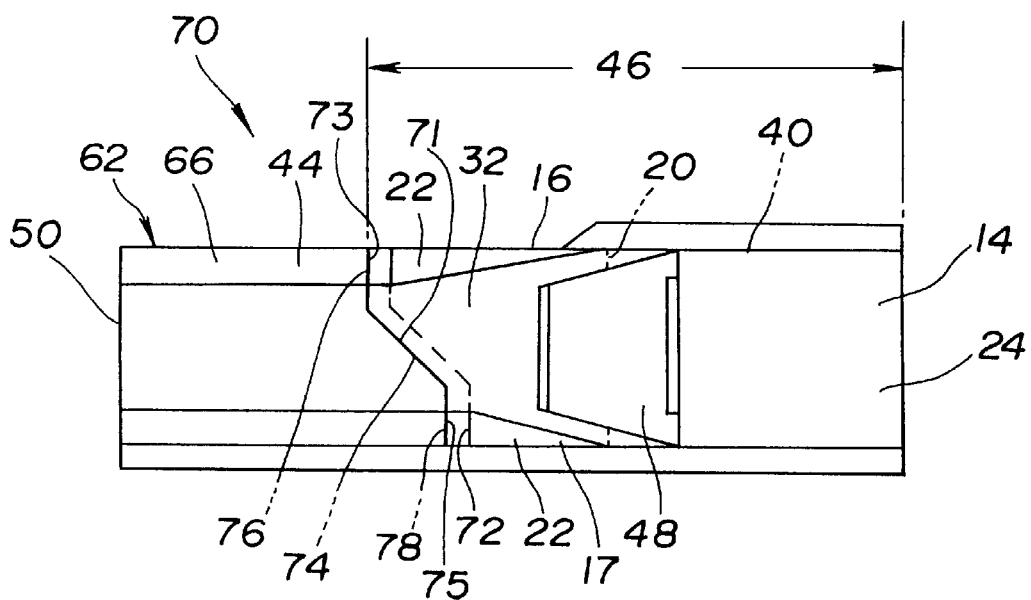
FIG. 10 is a side view of the vehicle member of FIG. 9.

Referring to FIGS. 9 and 10, a third preferred embodiment is explained, in which a vehicle member 70 is different in arrangements of the intermediate portion 16 and the reinforcement 40 from the vehicle member 60 of the second embodiment described above. Like reference numerals denote line parts and therefore detailed descriptions therefor are omitted.

As illustrated in FIGS. 9 and 10, the front portion 66 of the vehicle member 70 has a bay-like or step-like shaped rear end 71 connected via the intermediate portion 16 to the rear portion 14. The bay-like shaped rear end 71 is not in a vertical plane and includes a plurality of portions axially displaced from each other. Specifically, the rear end 71 of the front portion 66 includes a forward projecting portion 73 and a rearward retracted portion 75 displaced axially backward from the forward projecting portion 73. The transitional portion 17 of the intermediate portion 16 has a bay-like shaped front end 72 extending along the rear end 71 of the front portion 66. The front end 72 of the transitional portion 17 includes front ends of the three transitional surfaces 22 disposed adjacent to the inner wall 32 and the lower wall of the transitional portion 17. FIGS. 9 and 10 illustrate two, namely inner-upper and inner-lower transitional surfaces 22, of the three and the front ends thereof axially displaced from each other. The inner-upper transitional surface 22 has the foremost front end among the remainder transitional surfaces 22. The reinforcement 40 has a bay-like shaped front end 74 corresponding to the rear end 71 of the front portion 66. Thus, the bay-like shaped front end 74 of the reinforcement 40 includes a forward projecting edge portion 76 and a rearward retracted edge portion 78 which are displaced axially from each other. The rearward retracted edge portion 78 is backward displaced from the foremost front end of the inner-upper transitional surface 22. The reinforcement 40 covers the rear portion 14 and the intermediate portion 16 and extends forward beyond the front ends of the transitional surfaces 22 to the front portion 66 to define the readily collapsible zone 44 at the front portion 66. Therefore, the third embodiment provides an increased collapsibility at the front portion 66 of the vehicle member 70 and energy absorption thereat in response to collision, as explained in the second embodiment.

Figure 11:
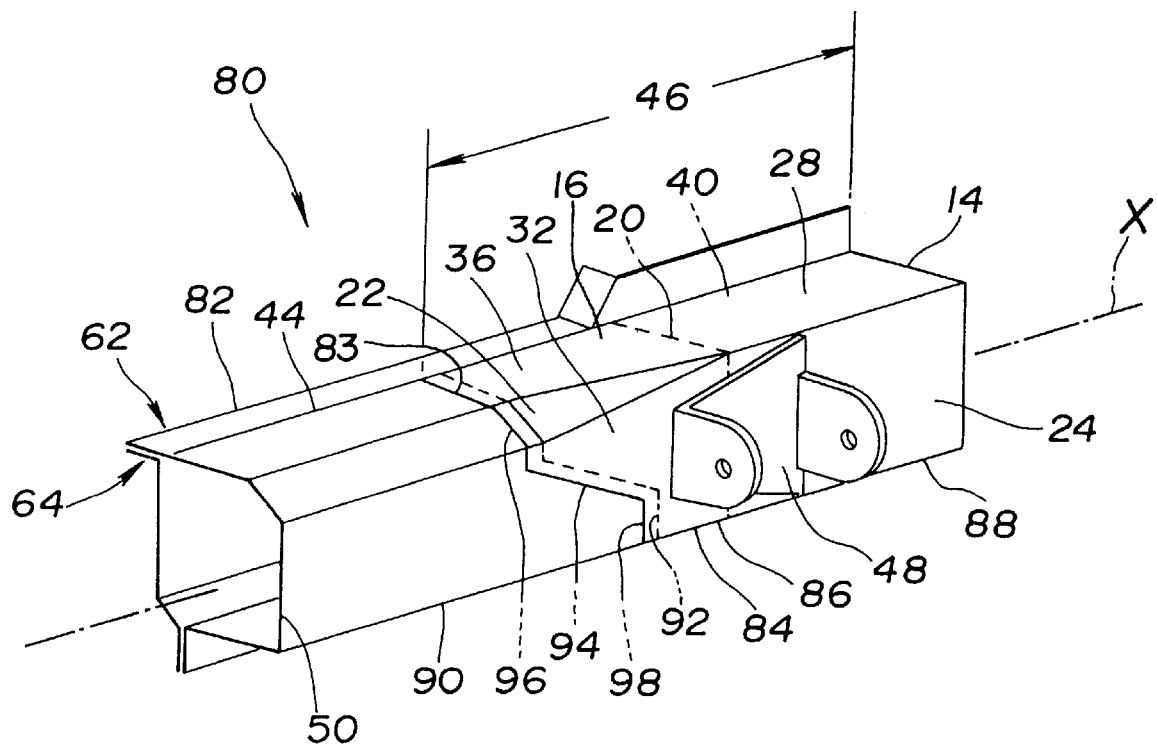
FIG. 11 is a perspective view of a vehicle member of a fourth embodiment.
Figure 12:
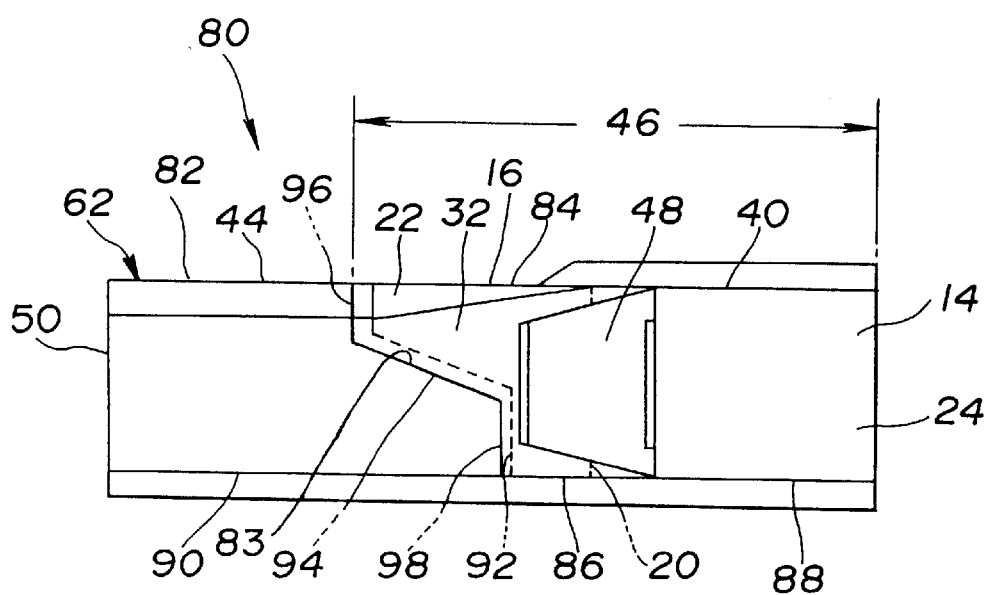
FIG. 12 is a side view of the vehicle member of FIG. 11.

Referring to FIGS. 11 and 12, a fourth embodiment is described, in which a vehicle member 80 differs in configuration of its front portion 82 and transitional portion 84 and arrangement of the reinforcement 40, from the vehicle member 60 of the second embodiment. Therefore, like reference numerals denote like parts and detailed explanations therefor are omitted.

As illustrated in FIG. 11, the front portion 82 of the vehicle member 80 is so configured as to have a hexagonal cross section. The front portion 82 has a bay-like shaped rear end 83 connected via the intermediate portion 16 to the rear portion 14. The rear end 83 is not placed in a vertical plane and includes a forward projecting portion and a rearward retracted portion. The transitional portion 84 of the intermediate portion 16 has a bay-like shaped front end 92 extending along the rear end 83 of the front portion 82. The front end 92 is not placed in a vertical plane and includes portions axially displaced from each other. Specifically, the front end 92 includes a forward projecting portion defining the front end portion of the transitional surface 22, and a rearward retracted portion located at the inner-lower edge 86. The transitional portion 84 has two, inner-upper and outer-lower, transitional surfaces 22 diagonally opposed to each other, one of which is shown in FIGS. 11 and 12. The transitional portion 84 has first edges, namely inner-upper edges and outer-lower edges which are respectively branched from the vertex of the rear portion 14 to define the transitional surfaces 22. The transitional portion 84 also has a second edge, namely an inner-lower edge 86 continuously connected to the corresponding edge 88 passing through the vertex of the rear portion 14 without defining the transitional surface 22. The inner-lower edge 86 is also continuously connected to the corresponding edge 90 passing through the vertex of the front portion 82. The reinforcement 40 has a bay-like shaped front end 94 as the one end thereof, corresponding to the rear end 83 of the front portion 82. The bay-like shaped front end 94 of the reinforcement 40 includes a foremost edge portion 96 extending forward across the front end of the inner-upper transitional surface 22 to the forward projecting portion of the rear end 83 of the front portion 82. The bay-like shaped front end 94 of the reinforcement 40 also includes a rearward retracted edge portion 98 which is displaced axially backward from the front end of the inner-upper transitional surface 22 and disposed near the one end of the bracket 48. Thus, the reinforcement 40 covers the rear portion 14 and the intermediate portion 16 and extends beyond the front end of the transitional portion 84 to the front portion 82 to define the readily collapsible zone 44 at the front portion 82. This fourth embodiment performs same effects as explained in the second embodiment. Further, the reinforcement 40 with the bay-like shaped front end 94 serves for reducing a weight of the vehicle member 80.

Figure 13:
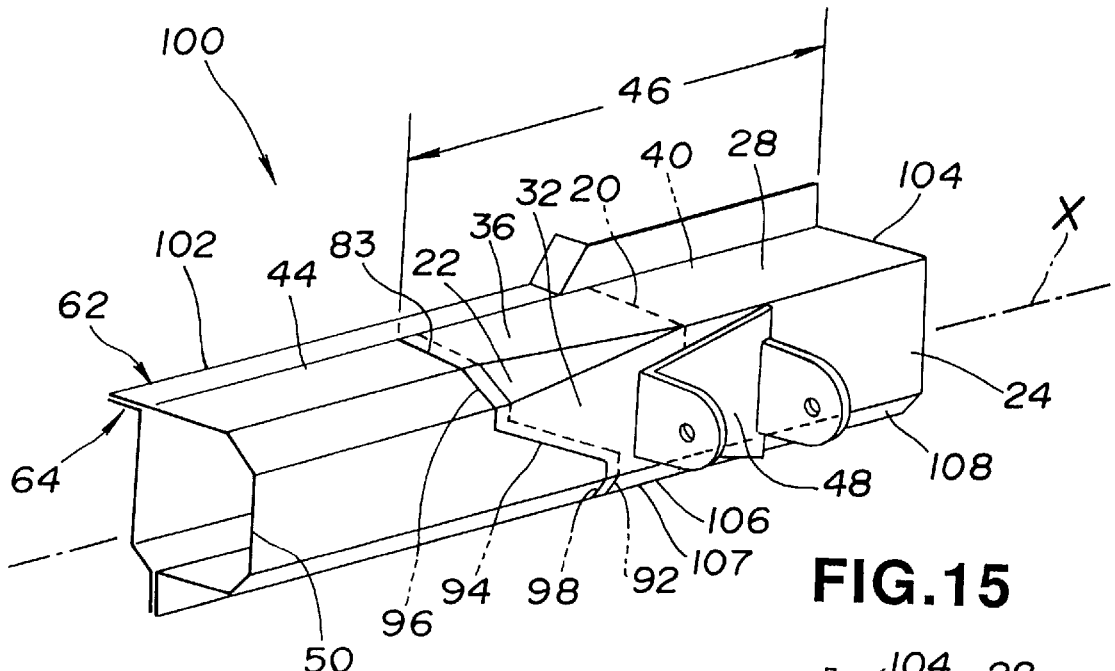
FIG. 13 is a perspective view of a vehicle member of a fifth embodiment.
Figure 15:
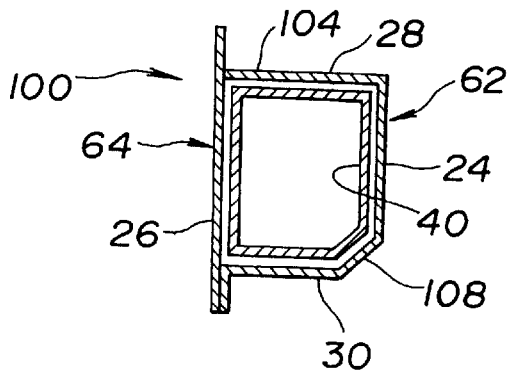
FIG. 15 is a sectional view taken along line 15—15 of FIG. 14.
Figure 14:
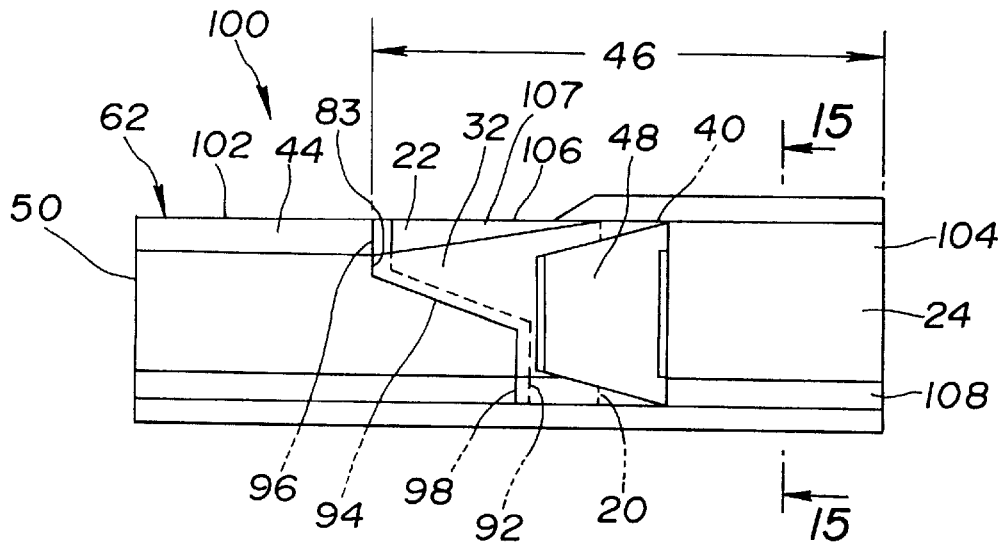
FIG. 14 is a side view of the vehicle member of FIG. 13.

Referring to FIGS. 13–15, a fifth embodiment is now explained, in which a vehicle member 100 differs in configuration of a front portion 102, a rear portion 104, and an intermediate portion 106 having a transitional portion 107 from the vehicle member 80 of the fourth embodiment. Like reference numerals denote like parts.

As seen from FIGS. 13 and 15, the vehicle member 100 has at its inner-lower portion a chamfered wall portion 108 extending over the entire length of the vehicle member 100 in the fore-and-aft direction. The chamfered wall portion 108 is interposed between the respective inner and lower walls of the front, rear, and intermediate portions 102, 104, and 106 of the vehicle member 100. With the chamfered wall portion 108, the front portion 102 has a heptagonal cross section and the rear portion 104 has a pentagonal cross section. The rearward retracted portion of the front end 92 of the transitional portion 107 extends downward across the chamfered wall portion 108. Similarly, the rearward retracted portion of the rear end 83 of the front portion 102 extends downward across the chamfered wall portion 108 as well as the rearward retracted edge portion 98 of the bay-like shaped front end 94 of the reinforcement 40 does. The fifth embodiment performs same effects as explained in the fourth embodiment. Further, the provision of the chamfered wall portion 108 serves for increasing rigidity of the vehicle member 100 with respect to a compression force axially applied to the vehicle member 100.

Figure 16:
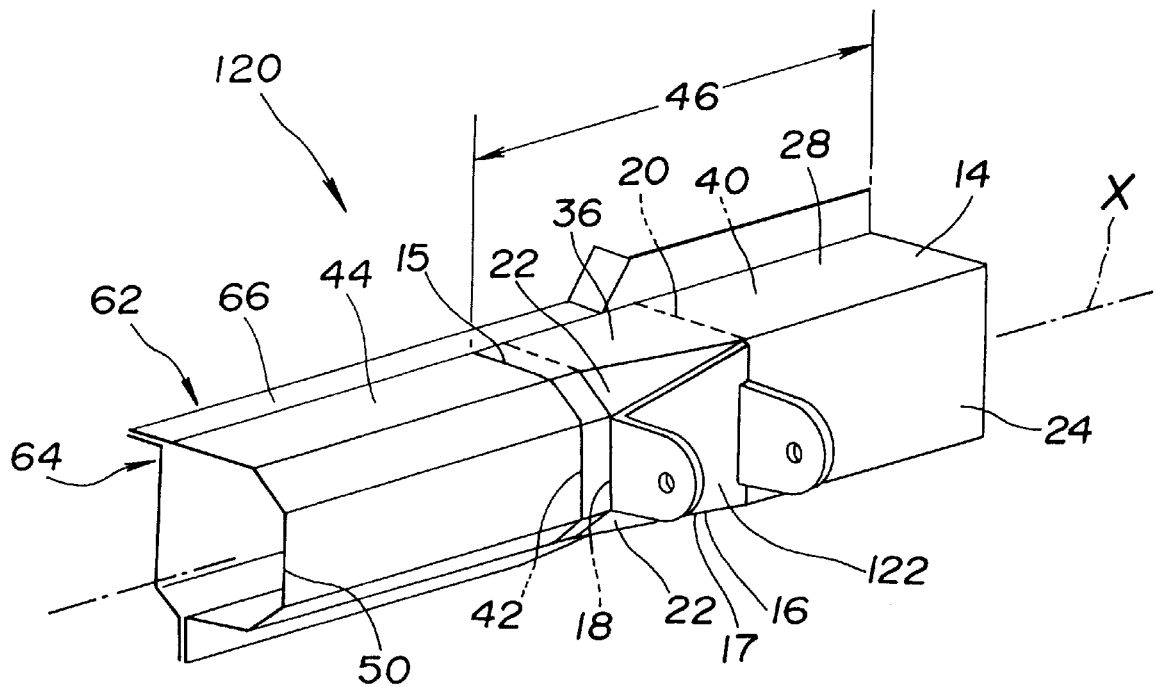
FIG. 16 is a perspective view of a vehicle member of a sixth embodiment.
Figure 17:
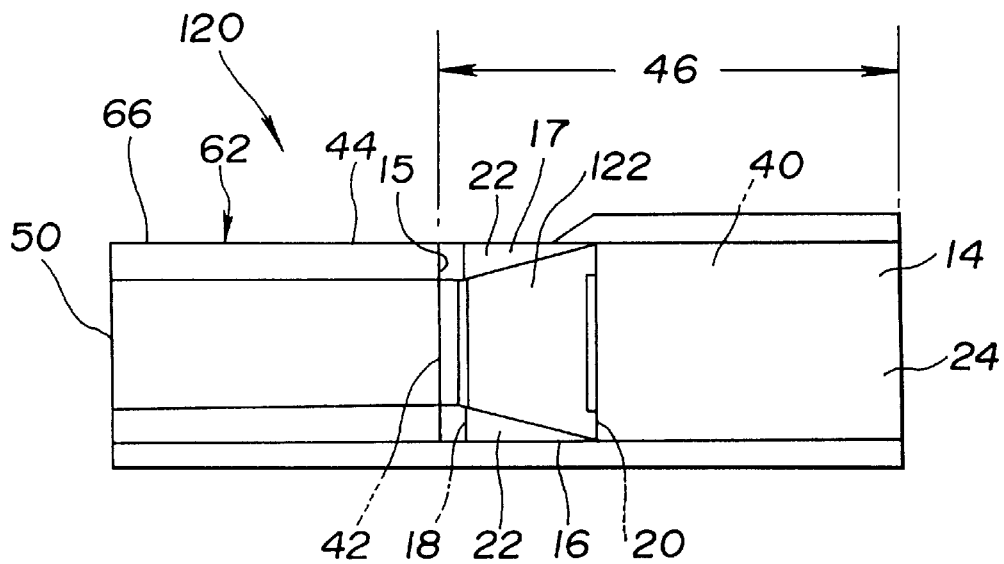
FIG. 17 is a side view of the vehicle member of FIG. 16.
Figure 18:
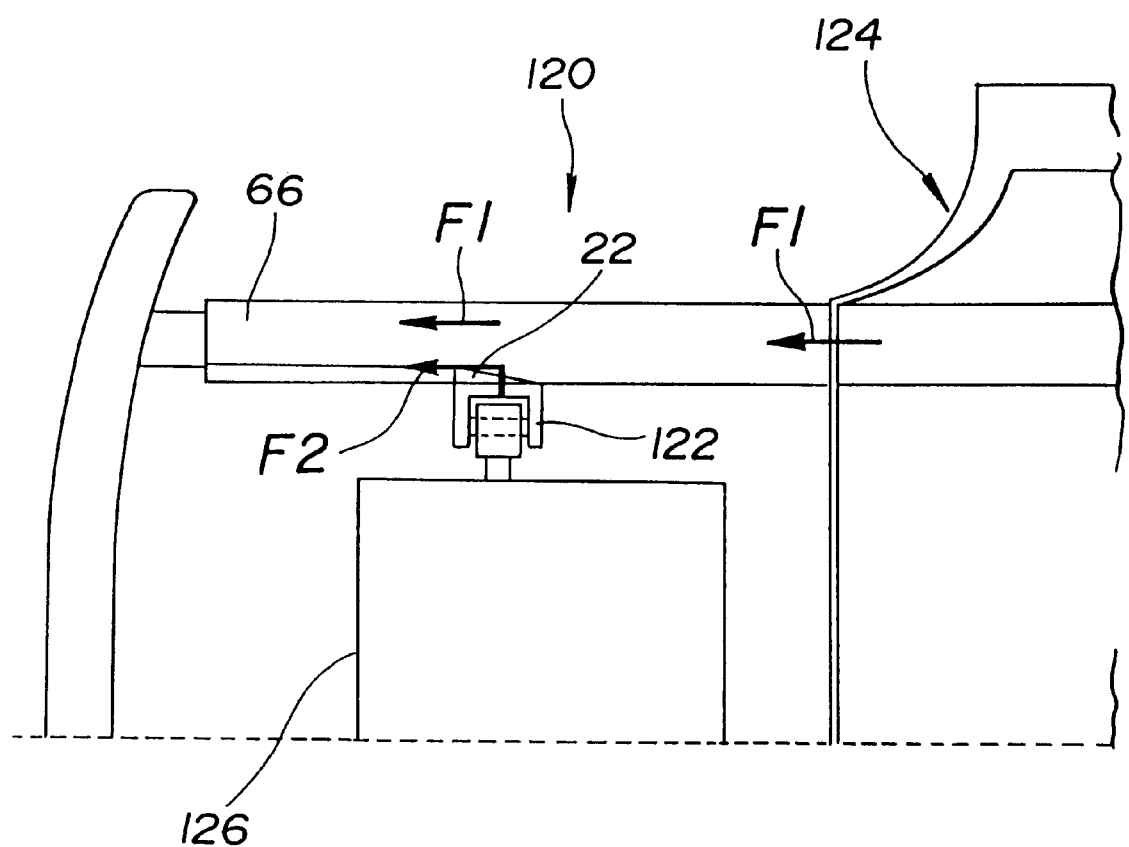
FIG. 18 is a top plan view of the vehicle member of FIG. 16.

Referring to FIGS. 16–18, a sixth embodiment will now be explained. A vehicle member 120 of this embodiment is similar to the vehicle member 60 of the second embodiment except an arrangement of a bracket 122. Like reference numerals indicate like parts and therefore detailed descriptions therefor are omitted.

As illustrated in FIGS. 16 and 17, the bracket 122 coextends with an entire axial length of the transitional portion 17, having same axial length as an axial length of the transitional surfaces 22. The bracket 122 has one end and an opposite end which are axially aligned with the front ends and the rear ends of the transitional surfaces 22. This arrangement of the bracket 122 allows the transitional surfaces 22 to be increased in rigidity, serving for preventing the transitional surfaces 22 from being undesirably collapsed and deformed upon collision.

As illustrated in FIG. 18, when collision occurs at the front end structure of a vehicle body 124, an inertia force F1 of the vehicle body 124 is applied axially forward to the front portion 66 of the vehicle member 120. In this condition, an inertia force F2 of an engine 126 is also applied axially forward to the front portion 66 via the bracket 122 and the transitional surfaces 22. The axially aligned arrangement of the bracket 122 with the transitional surfaces 22 causes the front portion 66 of the vehicle member 120 to be more collapsible with respect to a compression force applied to the front portion 66 than the above-described embodiments with non-aligned arrangement of the bracket 48. This allows decrease of the reinforcement 40 in thickness, serving for reducing a weight of the vehicle member 120 and thus a total weight of the vehicle.

Figure 19:
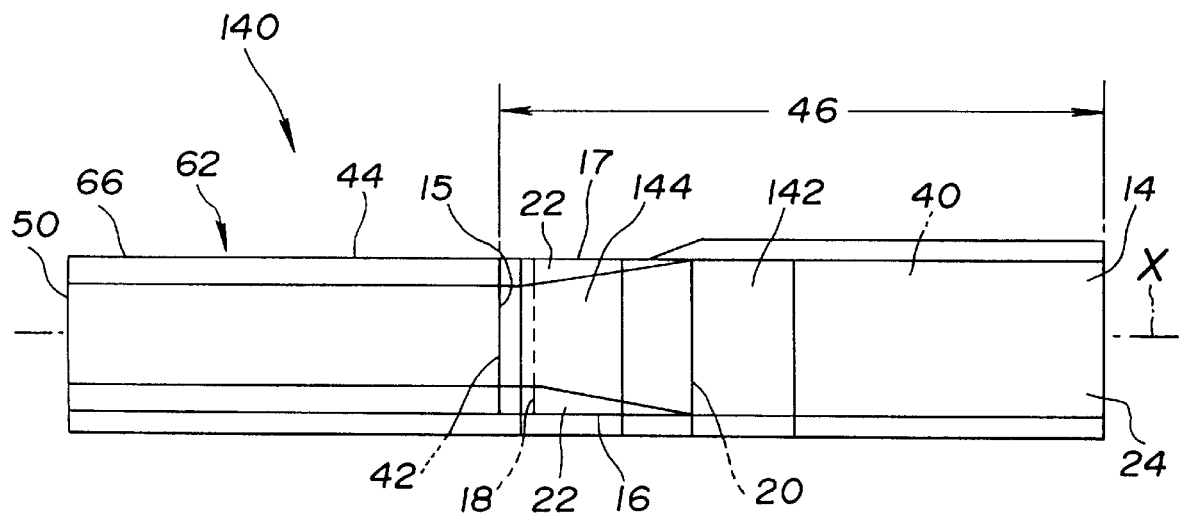
FIG. 19 is a side view of a vehicle member of a seventh embodiment.
Figure 20:
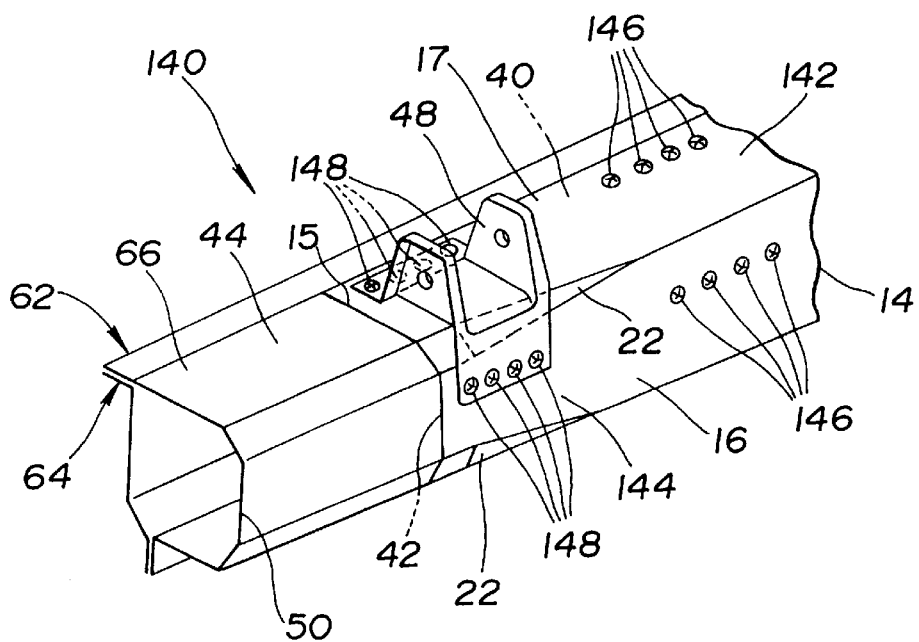
FIG. 20 is a perspective view of the vehicle member of FIG. 19 and a bracket mounted thereto.

Referring to FIGS. 19 and 20, a seventh embodiment will now be explained, in which a vehicle member 140 is similar to the vehicle member 60 of the second embodiment except that a plurality of mounting sites for the bracket 48 are provided axially offset.

As best shown in FIG. 19, the vehicle member 140 has a rear mounting site 142 disposed on the rear portion 14 and a front mounting site 144 disposed on the transition portion 17 of the intermediate portion 16. Specifically, the front mounting site 144 extends rearward from near the front ends of the transitional surfaces 22 and terminates before the rear ends of the transitional surfaces 22. The rear and front mounting sites 142 and 144 are so disposed as to be covered with the reinforcement 40. In either case of mounting the bracket 48 to the rear mounting site 142 and the front mounting site 144, the reinforcement 40 covers the rear and intermediate portions 14 and 16 and extends forward across the front end 18 of the transitional portion 17 to the front portion 66 to define the readily collapsible zone 44 at the front portion 66. Particularly, if the bracket 48 is mounted to the front mounting site 144 as a foremost mounting site as shown in FIG. 20, the transitional portion 17 with the transitional surfaces 22 is increased in rigidity and therefore the front portion 66 is more collapsible at the readily collapsible zone 44 in response to collision. Reference numerals 146 and 148 denote fastening portions provided on each of the rear and front mounting sites 142 and 144 for securing the bracket 48 to the vehicle member 140. The bracket 48 is fixed to the fastening portions 146 and 148 by spot welding, fastening members such as bolts and nuts, or the like. The fastening portions 146 and 148 are disposed within the range 46 covered with the reinforcement 40. Owing to the provision of the plurality of mounting sites 142 and 144, the bracket 48 is mounted to the vehicle member 140 at different positions of the mounting sites which are determined depending on various models or types of vehicles and engines. Thus, the vehicle member 140 is applicable to various models of vehicles and engines within engine rooms thereof regardless the positions of the bracket, serving for reducing the manufacturing cost of the vehicle.

Figure 21:
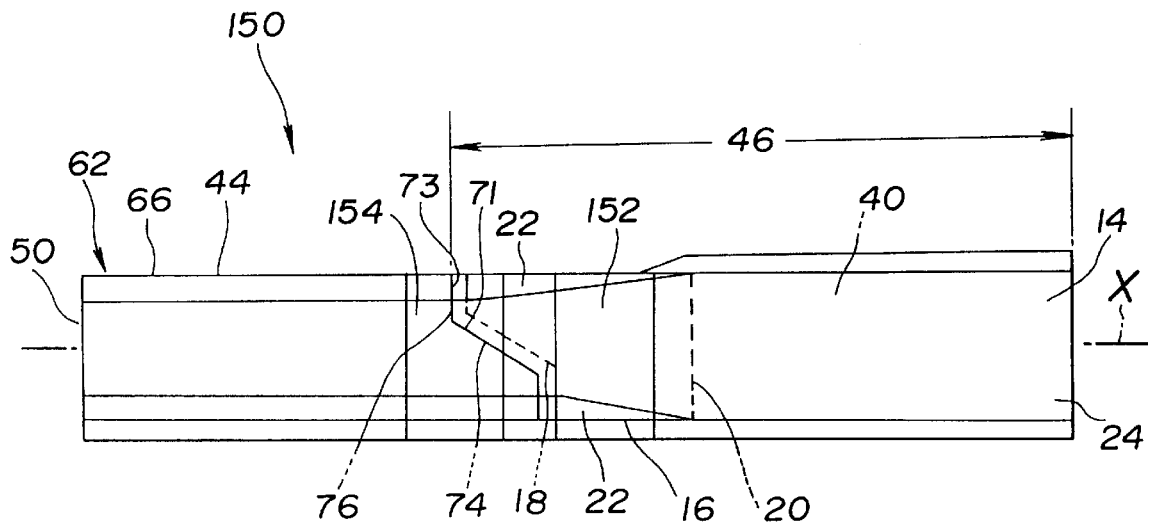
FIG. 21 is a side view of a vehicle member of an eighth embodiment.
Figure 22:
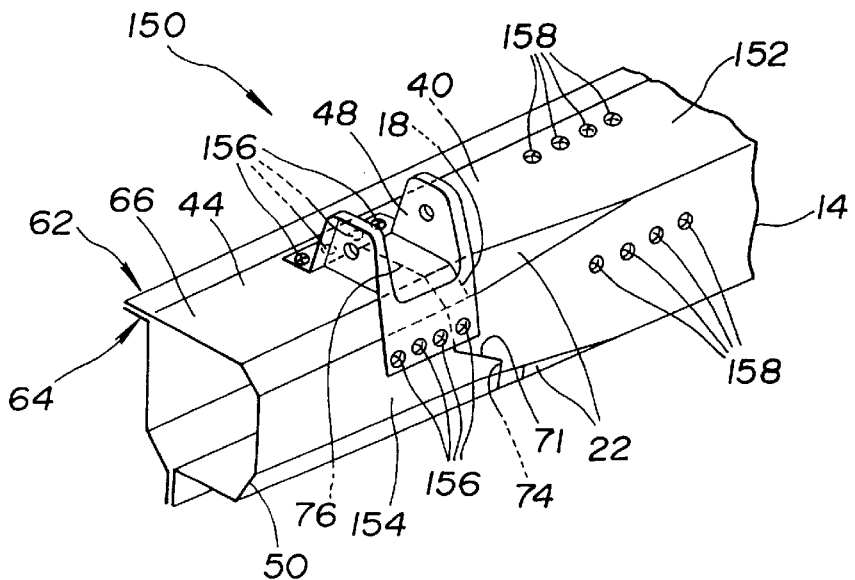
FIG. 22 is a perspective view of the vehicle member of FIG. 21 and a bracket mounted thereto.

Referring to FIGS. 21 and 22, an eighth embodiment is explained hereinafter. A vehicle member 150 of this embodiment differs in provision of two mounting sites 152 and 154 axially displaced from each other, from the vehicle member 70 of the third embodiment.

As best shown in FIG. 21, the rear mounting site 152 is disposed close to the rear end of the inner-upper transitional surface 22, and the front mounting site 154 is disposed to overlap the front end of the inner-upper transitional surface 22. At least one part of the front mounting site 154 overlaps the forward projecting edge portion 76 of the reinforcement 40.

In a case where the bracket 48 is mounted to the front mounting site 154 as illustrated in FIG. 22, the overlapping arrangement of the bracket 48 on the reinforcement 40 causes same effects as explained in the seventh embodiment. The front and rear mounting sites 154 and 152 respectively have a plurality of fastening portions 156 and 158 for securing the bracket 48 to the vehicle member 150. The fastening portions 156 on the front mounting site 154 includes at least a number of fastening portions disposed in the range 46 covered with the reinforcement 40. Owing to this arrangement, there exists no clearance between the forward projecting edge 76 of the front end 74 of the reinforcement 40 and the front mounting site 154. If the clearance exists between the foremost portion of the front end 74 of the reinforcement 40 and the front mounting site 154, this causes decrease of strength of the portion of the vehicle member corresponding to the clearance. If a load is axially applied to the front portion 66, then it is likely that undesired buckling is caused at the portion with the clearance depending on a balance relation between strength of the vehicle member 150 and weight of the engine exerted on the bracket 48. Therefore, this arrangement serves for preventing buckling undesirably caused by the clearance.

Figure 23:
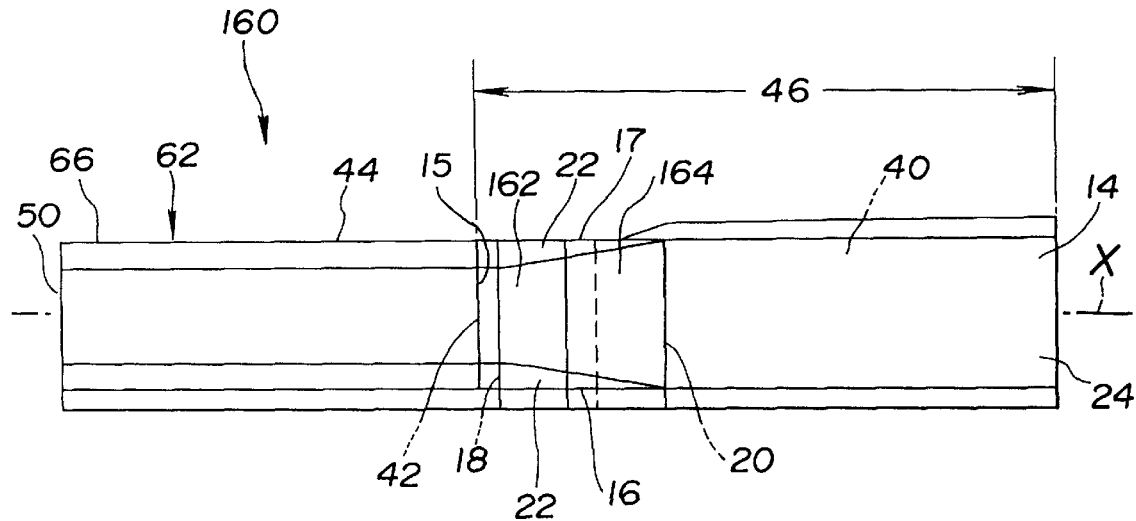
FIG. 23 is a side view of a vehicle member of a ninth embodiment.

Referring to FIG. 23, a ninth embodiment now is explained, in which a vehicle member 160 differs in overlapping arrangement of front and rear mounting sites 162 and 164 from the above-described seventh embodiment.

As illustrated in FIG. 23, the vehicle member 160 includes the front mounting site 162 and the rear mounting site 164 partly overlapping one on another. This embodiment makes same effects as explained in the seventh embodiment. Meanwhile, such overlapping arrangement of the front and rear mounting sites 162 and 164 is applicable to the above-described eighth embodiment.

Figure 24:
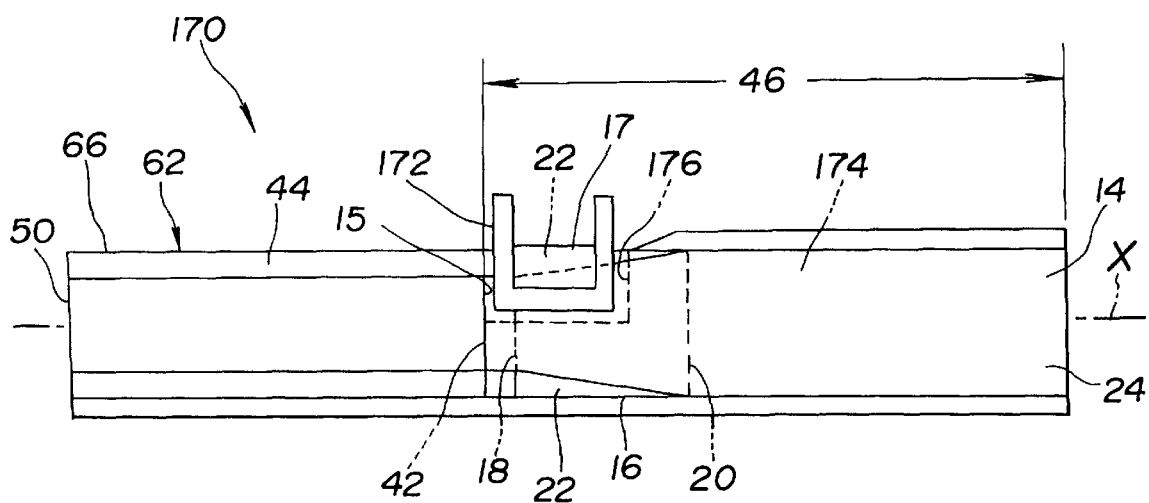
FIG. 24 is a side view of a vehicle member of a tenth embodiment.
Figure 25:
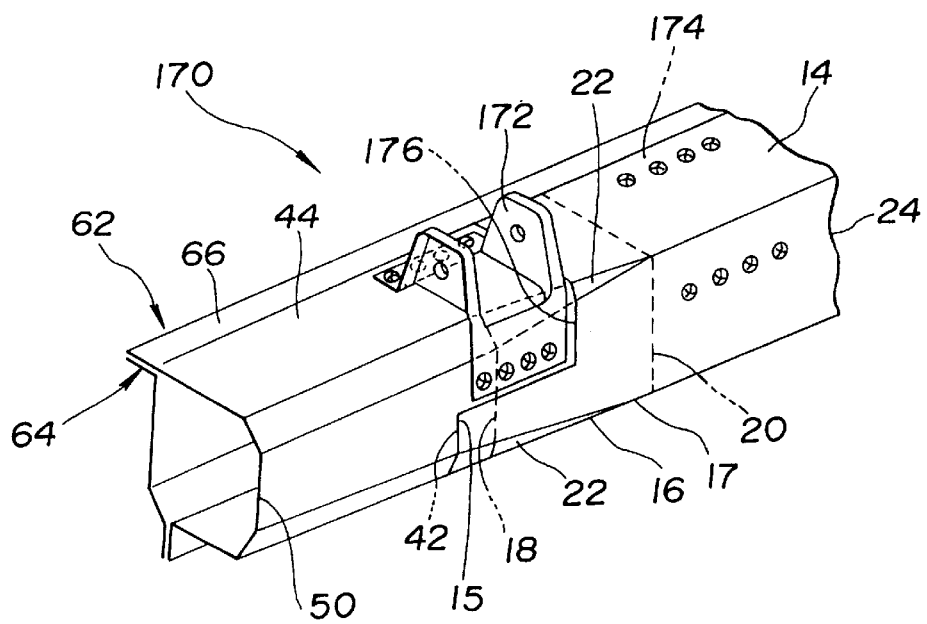
FIG. 25 is a perspective view of the vehicle member of FIG. 24.

Referring now to FIGS. 24 and 25, a tenth embodiment is explained. A vehicle member 170 of this embodiment is similar to the vehicle member 60 of the second embodiment except arrangements of a bracket 172 and a reinforcement 174.

As illustrated in FIGS. 24 and 25, the bracket 172 is so disposed as to cover the inner-upper transitional surface 22 of the transitional portion 17. The bracket 172 is disposed within the entire axial range 46 of the reinforcement 174. Specifically, the bracket 172 covers an upper part of the transitional portion 17 which includes a part of the inner-upper transitional surface 22 and a part of the front end 18 of the transitional portion 17. The reinforcement 174 is formed with a cutout 176 corresponding to the parts covered by the bracket 172. Thus, the bracket 172 acts as a reinforcement provided on the inner-upper transitional surface 22, serving for preventing the vehicle member 170 from being undesirably deformed or buckled at the inner-upper transitional surface 22. Similarly, the reinforcement 174 covering the inner-lower transitional surface 22 contributes to prevent the occurrence of undesirable deformation or buckling at the inner-lower transitional surface 22. Further, the provision of the cutout 176 allows reduction of the total weight of the vehicle. In addition, this arrangement provides a double-layered structure compound of the bracket 172 and the member on the bracket-mounting portion of the vehicle member 170, facilitating assembling operation in the case of welding the bracket 172 onto the vehicle member 170.

Figure 26:
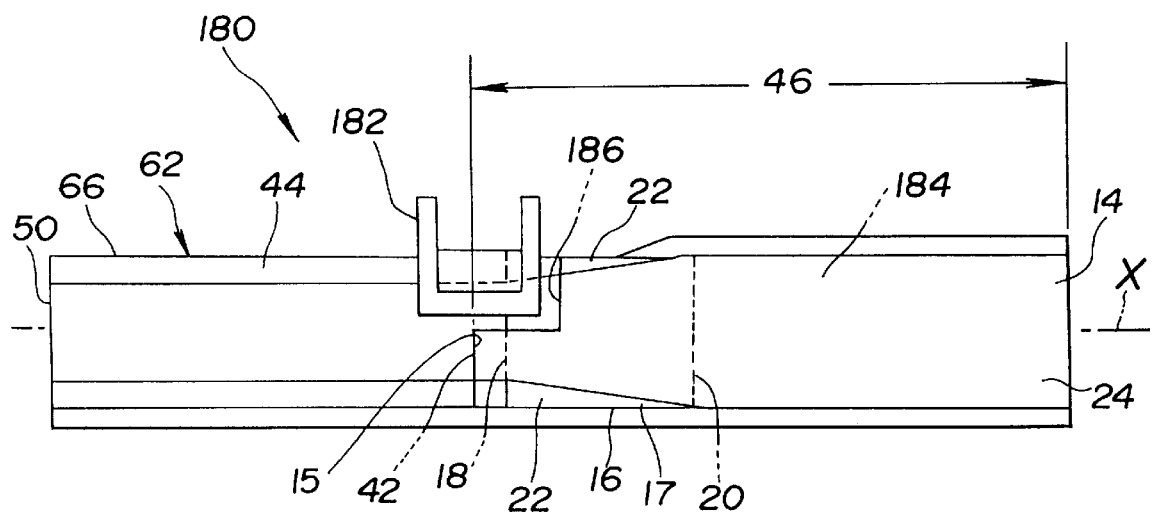
FIG. 26 is a side view of a vehicle member of an eleventh embodiment.

Referring to FIG. 26, an eleventh embodiment is explained, in which a vehicle member 180 differs in arrangement of a bracket 182 and a reinforcement 184 from the vehicle member 170 of the above-described tenth embodiment.

As illustrated in FIG. 26, the bracket 182 is disposed in a position displaced axially forward from the position of the bracket 172 of the tenth embodiment. The bracket 182 partly overlaps the front end of the inner-upper transitional surface 22 of the transitional portion 17. Thus, the bracket 182 is partly disposed in the axial range 46 of the reinforcement 184. The reinforcement 184 has a cutout 186 smaller in size than the cutout 176 of the tenth embodiment corresponding to the axially displacing position of the bracket 182. This arrangement of the bracket 182 partly overlapping the front end of the transitional surface 22 performs same effects as explained in the above-described tenth embodiment.

Figure 27:
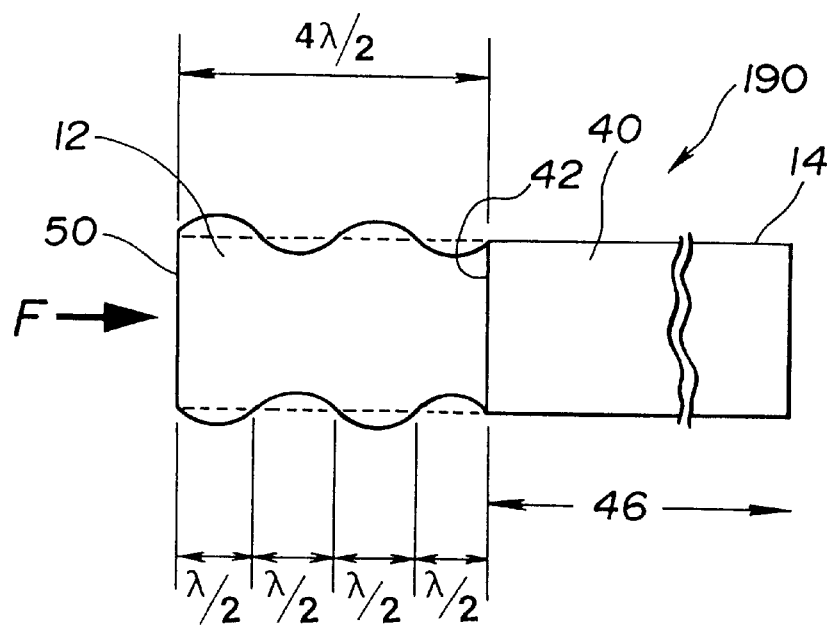
FIGS. 27 and 28 show a vehicle member of a twelfth embodiment.
Figure 28:
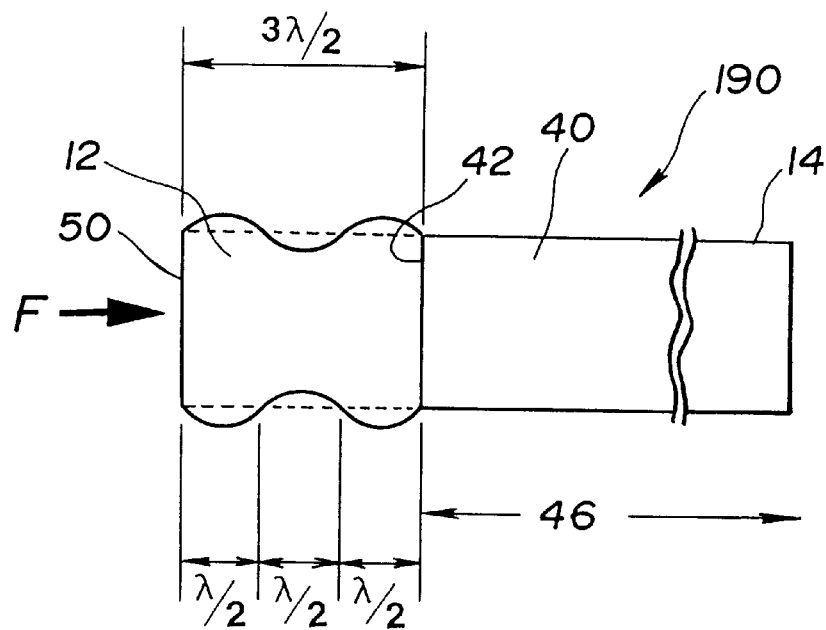

Referring to FIGS. 27 and 28, a twelfth embodiment will be explained hereinbelow, in which a vehicle member 190 is provided with the readily collapsible zones determined by arranging the reinforcement 40 in a predetermined position. The vehicle member 190 is constructed as explained in the first embodiment and other preceding embodiments.

As illustrated in FIGS. 27 and 28, assuming that a compression force or load F is axially applied to the front end 50 of the front portion 12 of the vehicle member 190 and the front portion 12 is so constructed as to cause crushing with a predetermined wavelength λ, the front end 42 of the reinforcement 40 is located on the front portion 12 at a position distanced by Nλ/2 from the front end 50 of the front portion 12, where N is an integer of more than one. Namely, in FIG. 27, N is four and the front end 42 of the reinforcement 40 is located at a position distanced by 4λ/2=2λ from the front end 50 of the front portion 12. In FIG. 28, N is three and the front end 42 of the reinforcement 40 is located at a position distanced by 3λ/2 from the front end 50 of the front portion 12. Thus, since the position of the front end 42 of the reinforcement 40 is calculated by multiplying the wavelength λ by integer N, the readily collapsible zone uncovered with the reinforcement 40 is easily determined. This contributes to enhance the collapsibility at the front portion 12 of the vehicle member 190.

The wavelength λ is determined on the basis of a buckling waveform produced after the compression force F reaches a peak thereof. Since the determination of the wavelength λ is not carried out by a trail-and-error testing but analyzing the buckling waveform, time required for the determination of λ is reduced. U.S. Pat. No. 5,048,345 disclosed a technique relating to a method of determining positions of beads.

Referring to FIGS. 29A–31B, a thirteenth embodiment now is explained, showing modified vehicle members 200, 210, and 220 different in cross section at front portions 202, 212, and 222 thereof. The modified vehicle member 200, 210, and 220 are made by extrusion molding a suitable material, for instance, aluminum alloy. The remainder portions of these modified vehicle members 200, 210, and 220 are similar to the preceding embodiments, and therefore explanations therefor are omitted.

As illustrated in FIGS. 29A and 29B, the vehicle member 200 includes the front portion 202 having a heptagonal cross section.

As illustrated in FIGS. 30A and 30B, the vehicle member 210 includes the front portion 212 having a hexagonal cross section.

As illustrated in FIGS. 31A and 31B, the vehicle member 220 includes the front portion 222 having a pentagonal cross section.

Referring to FIGS. 32A–39B, a fourteenth embodiment is explained, showing further modified vehicle members 300, 320, 340, 360, 380, 400, 420, and 440 including front portions 302, 322, 342, 362, 382, 402, 422, and 442 different in cross section. Each of the vehicle members are composed of two members which are in the form of a panel and coupled together in a suitable manner such as welding.

Figure 32B:
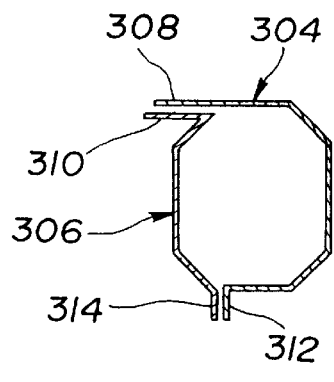
FIG. 32B is a sectional view taken along line 32B—32B of FIG. 32A.
Figure 32A:
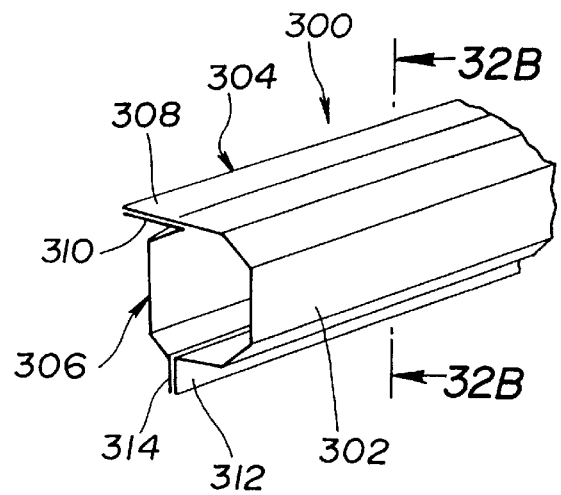
FIG. 32A is a perspective view of a further modified vehicle member.

As illustrated in FIGS. 32A and 32B, the front portion 302 is formed by connecting the two members 304 and 306 at their upper flanges 308 and 310 and lower flanges 312 and 314. The front portion 302 has an octagonal cross section. The upper flanges 308 and 310 extend laterally outward and the lower flanges 312 and 314 extend downward outward.

Figure 33B:
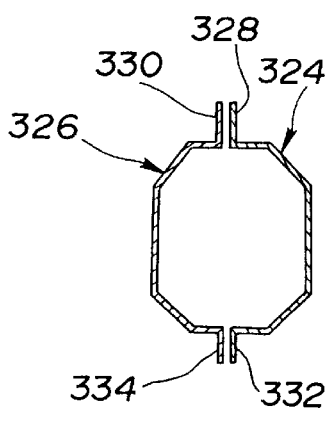
FIG. 33B is a sectional view taken along line 33B—33B of FIG. 33A.
Figure 33A:
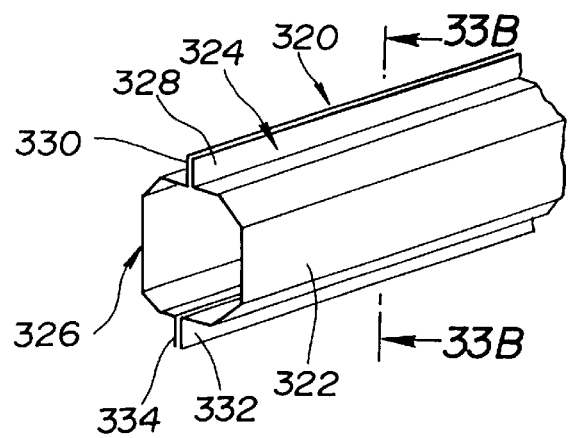
FIG. 33A is a perspective view of a further modified vehicle member.

As illustrated in FIGS. 33A and 33B, the front portion 322 is composed of the two members 324 and 326 each of which has an upward outward extending flange 328 and 330 and a downward outward extending flange 332 and 334. The members 324 and 326 are connected together at the flanges 328, 330, 332, and 334 to configure the front portion 322 of an octagonal shape in cross section. The upward outward extending flange 328 and 330 and the downward outward extending flange 332 and 334 are substantially vertically aligned.

Figure 34B:
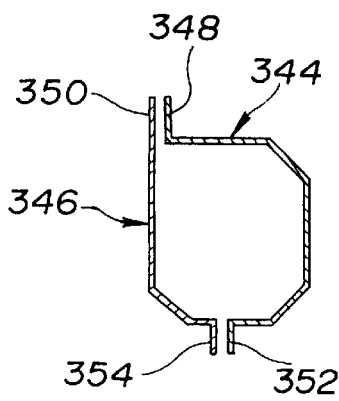
FIG. 34B is a sectional view taken along line 34B—34B of FIG. 34A.
Figure 34A:
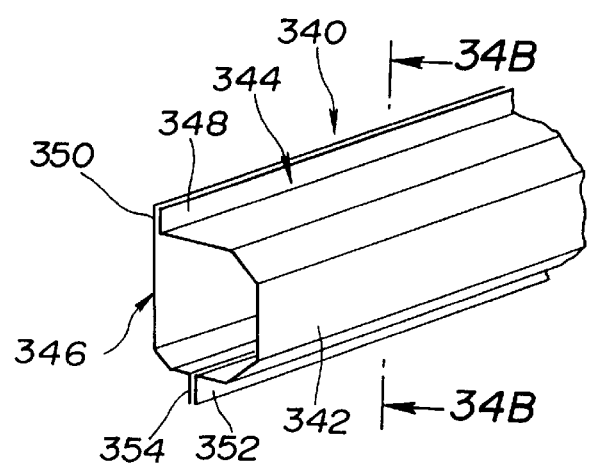
FIG. 34A is a perspective view of a further modified vehicle member.

As illustrated in FIGS. 34A and 34B, the front portion 342 has a heptagonal cross section. The front portion 342 is formed by connecting the two members 344 and 346 together at their upward outward extending flanges 348 and 350 and downward outward extending flanges 352 and 354. The upward outward extending flange 350 extends upward straightly from an uppermost end of the member 346 acting as a back plate.

Figure 35B:
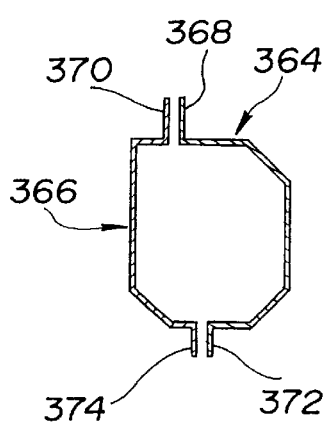
FIG. 35B is a sectional view taken along line 35B—35B of FIG. 35A.
Figure 35A:
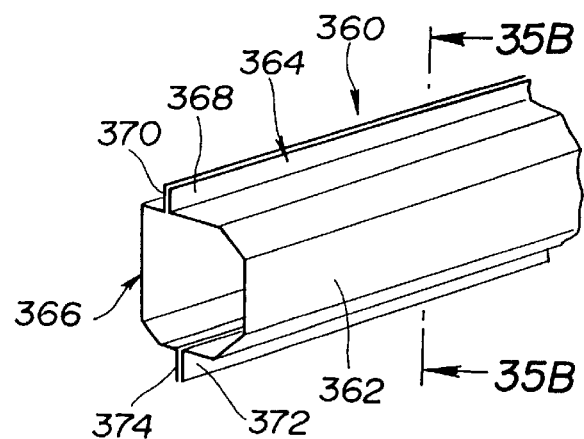
FIG. 35A is a perspective view of a further modified vehicle member.

As illustrated in FIGS. 35A and 35B, the front portion 362 has a heptagonal cross section similar to the front portion 342 shown in FIGS. 34A and 34B. The front portion 362 is composed of the two members 364 and 366 which are connected together at their upward outward extending flanges 368 and 370 and downward outward extending flanges 372 and 374. The upward outward extending flanges 368 and 370 are disposed at positions displaced laterally from the positions of the flanges 348 and 350 shown in FIGS. 34B.

Figure 36B:
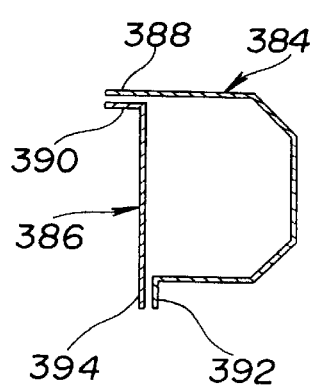
FIG. 36B is a sectional view taken along line 36B—36B of FIG. 36A.
Figure 36A:
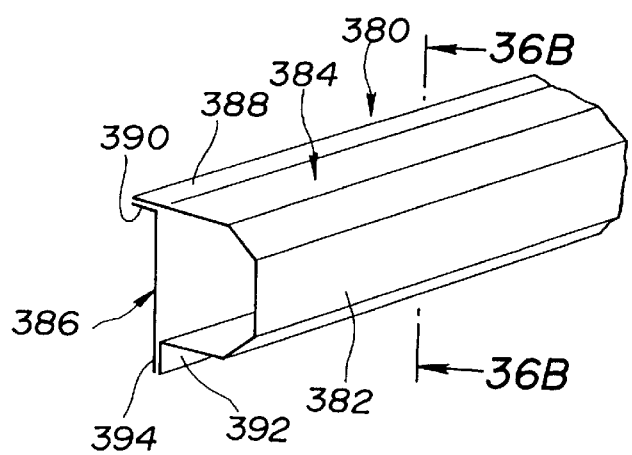
FIG. 36A is a perspective view of a further modified vehicle member.

As illustrated in FIGS. 36A and 36B, the front portion 382 is composed of the two members 384 and 386 each of which has a laterally outward extending flange 388 and 390 and a downward outward extending flange 392 and 394. The members 384 and 386 are connected together at the flanges 388, 390, 392, and 394 to configure the front portion 382 of a hexagonal shape in cross section.

Figure 37B:
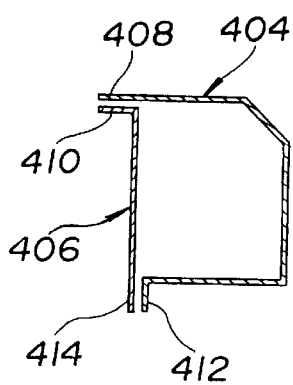
FIG. 37B is a sectional view taken along line 37B—37B of FIG. 37A.
Figure 37A:
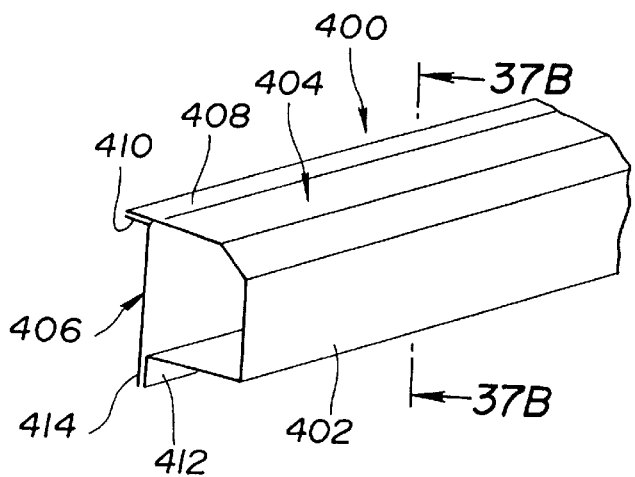
FIG. 37A is a perspective view of a further modified vehicle member.

As illustrated in FIGS. 37A and 37B, the front portion 402 has a pentagonal cross section. The front portion 402 is composed of the two members 404 and 406 with laterally outward extending flanged 408 and 410 and downward outward extending flanges 412 and 414, at which the members 404 and 406 are connected to each other. The member 404 is bent to form a lower edge 416 making substantially right angle.

Figure 38B:
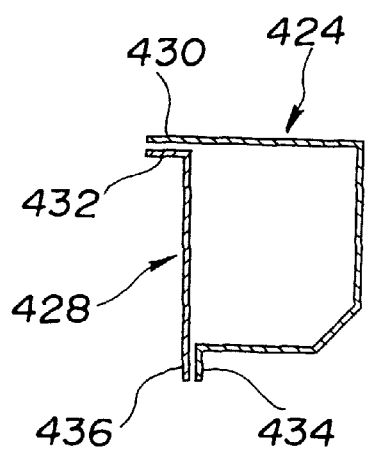
FIG. 38B is a sectional view taken along line 38B—38B of FIG. 38A.
Figure 38A:
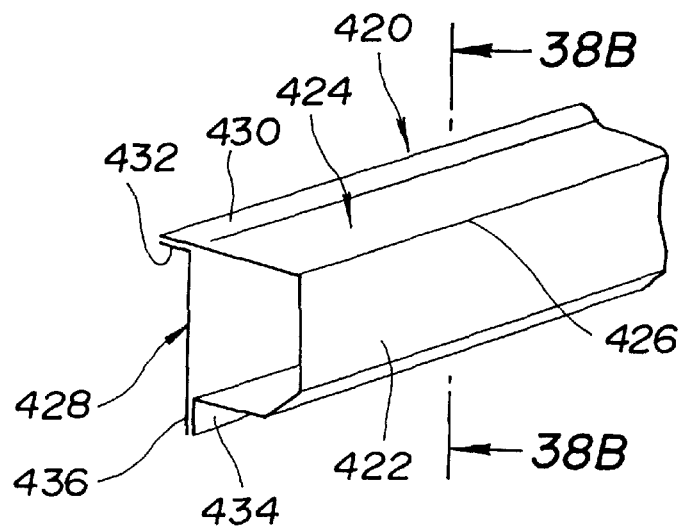
FIG. 38A is a perspective view of a further modified vehicle member.

As illustrated in FIGS. 38A and 38B, the vehicle member 420 is similar to the vehicle member 400 shown in FIGS. 37A and 37B except that the front portion 422 includes one member 424 bent to form an upper edge 426 at substantially right angle. The one member 424 is coupled with the other member 428 at their laterally outward extending flanges 430 and 432 and downward outward extending flanges 434 and 436, defining the pentagonal cross section.

Figure 39B:
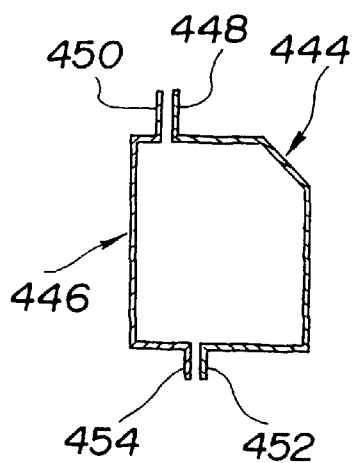
FIG. 39B is a sectional view taken along line 39B—39B of FIG. 39A.
Figure 39A:
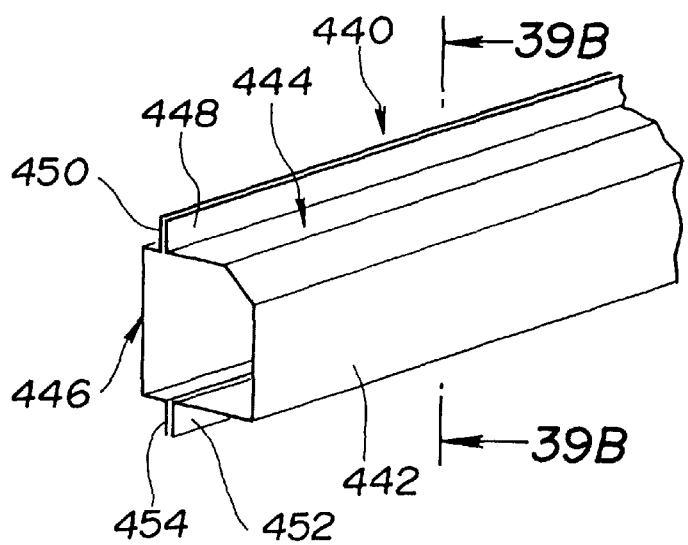
FIG. 39A is a perspective view of a further modified vehicle member.

As illustrated in FIGS. 39A and 39B, the front portion 442 has a pentagonal cross section. The front portion 442 is formed by connecting the two members 444 and 446 together at their upward outward extending flanges 448 and 450 and downward outward extending flanges 452 and 454. These flanges 448, 450, 452, and 454 are not in vertically alignment with each other.

Figure 40:
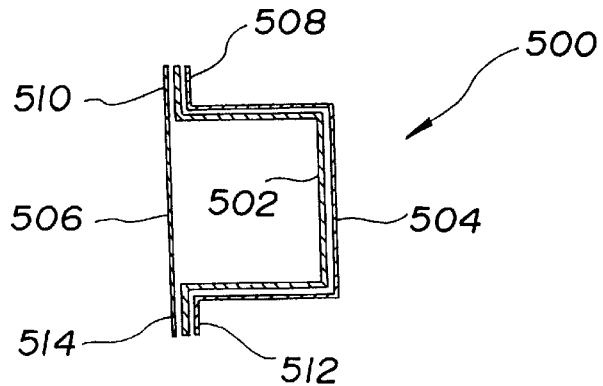
FIGS. 40–42 illustrate a fifteenth embodiment.
Figure 41:
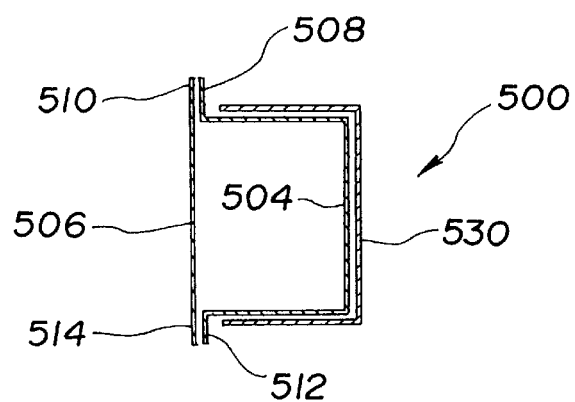
Figure 42:
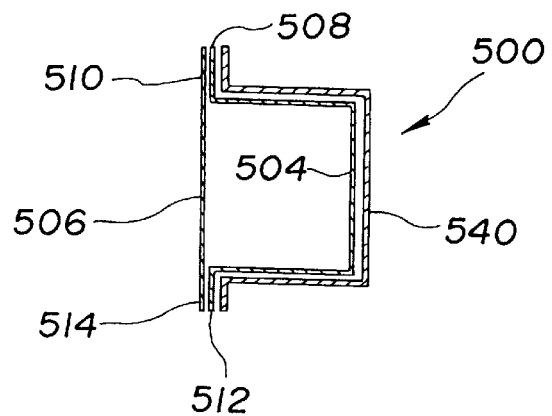

Referring to FIGS. 40–42, a fifteenth embodiment will now be explained, in which a vehicle member 500 includes the reinforcement 502, 530, and 540 different in arrangement from the reinforcement 40 of the above-described first embodiment. In this embodiment, the vehicle member 500 is composed of two members 504 and 506, one of which is of a hat-like shape in cross section. The members 504 and 506 have opposed flanges 508, 510, 512, and 514 extending outward upward and downward, respectively. Therefore, in FIGS. 40–42 like parts are denoted by like reference numerals.

As illustrated in FIG. 40, the reinforcement 502 having a hat-shaped cross section is disposed inside the member 504 having the hat-like shaped cross section. The reinforcement 502 is arranged in such a manner that an upward extending flange 516 thereof and a downward extending flange 518 thereof are interposed between the opposed flanges 508, 510, 512, and 514 of the members 504 and 506.

As illustrated in FIG. 41, the reinforcement 530 having a generally U-shaped cross section is disposed outside the member 504.

As illustrated in FIG. 42, the reinforcement 540 having a hat-shaped cross section is disposed outside the member 504.

Figure 43:
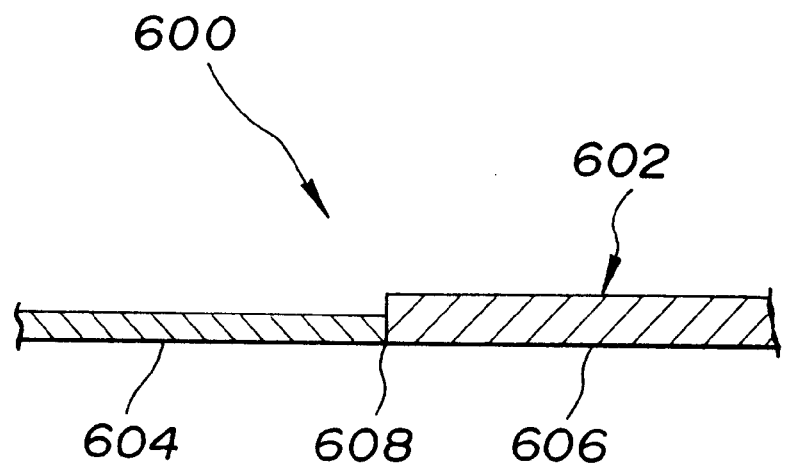
FIGS. 43 and 44 illustrate a sixteenth embodiment, showing fragmentary sectional views of further modified vehicle member.
Figure 44:
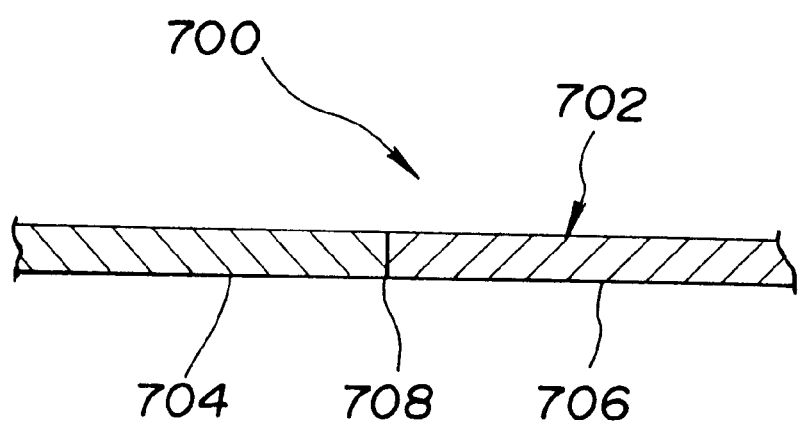

Referring to FIGS. 43 and 44, a sixteenth embodiment is explained, in which vehicle members 600 and 700 are similar to the preceding embodiments except modified reinforcements 602 and 702. The vehicle members 600 and 700 are of the elongated hollow column shape and includes the rear, intermediate, the front portions as explained in the preceding embodiments. Therefore, detailed explanations about these components are omitted.

As illustrated in FIG. 43, the vehicle member 600 includes a first panel portion 604 having a thickness and a second panel portion 606 having a greater thickness than that of the first panel portion 604. Namely, the reinforcement 602 is provided by an increased thickness. The reinforcement 602 is provided at a portion which is larger in thickness than the remainder. The reinforcement 602 is so arranged as to cover the same range as explained in the preceding embodiments. These panel portions 604 and 606 are connected at 608 together by laser beam welding.

As illustrated in FIG. 44, the vehicle member 700 includes one panel portion 704 and the other panel portion 706 which have same thickness. The panel portion 704 has a rigidity and the other panel portion 706 has a greater rigidity than that of the one panel portion 704. Thus, the reinforcement 702 is provided by an increased rigidity. The reinforcement 702 is so arranged as to cover the same range as explained in the preceding embodiments. These panel portions 704 and 706 are connected at 708 together by laser beam welding.

The vehicle member according to the present invention is applicable to hood ledges extending in the fore-and-aft direction as well as the right and left members.

What is claimed is:

1. A vehicle member positionable in a vehicle body in fore-and-aft direction of the vehicle body, comprising:
    a first portion deformable to absorb energy, said first portion having a first polygonal cross section with vertexes;
    a second portion having a second polygonal cross section with less vertexes than the vertexes of said first polygonal cross section, wherein said second portion connects to the vehicle body;
    an intermediate portion connecting said first portion to said second portion, said intermediate portion gradually changing a cross section from said first polygonal cross section to said second polygonal cross section; and
    a reinforcement attached to at least one of said first, second, and intermediate portions;
    wherein said reinforcement extends from said intermediate portion.

2. A front side member positionable in a vehicle body in fore-and-aft direction the vehicle body, comprising:
    a first portion deformable to absorb energy caused by a compressive force, said first portion having a first polygonal cross section with vertexes;
    a second portion having a second polygonal cross section with less vertexes than the vertexes of said first polygonal cross section, wherein said second portion connects to the vehicle body to withstand the compression force applied thereto;
    an intermediate portion connecting said first portion to said second portion, said intermediate portion gradually changing a cross section from said first polygonal cross section to said second polygonal cross section; and
    reinforcement attached to at least one of said first, second, and intermediate portions;
    wherein said reinforcement extends from said intermediate portion.

3. A front side member positionable in a vehicle body in fore-and-aft direction of the vehicle body, comprising:
    a first portion deformable to absorb energy caused by a compressive force, said first portion having a first polygonal cross section with vertexes;
    a second portion having a second polygonal cross section with less vertexes than the vertexes of said first polygonal cross section, wherein said second portion connects to one structure of the vehicle body and transfers the compression force to other structure of the vehicle body;
    an intermediate portion connecting said first portion to said second portion, said intermediate portion gradually changing a cross section from said first polygonal cross section to said second polygonal cross section; and
    a reinforcement supporting at least one of said first, second, and intermediate portions, said reinforcement extending from said intermediate portion to said first portion to promote the deformation of said first portion.

4. A vehicle member as claimed in claim 1, wherein said first portion is positioned ahead of said second portion when the vehicle member is mounted to the vehicle.

5. A vehicle member as claimed in claim 1, wherein said reinforcement supports said second and intermediate portions.

6. A vehicle member as claimed in claim 2, wherein said reinforcement supports said second and intermediate portions.

7. A vehicle member as claimed in claim 3, wherein said reinforcement supports said second and intermediate portions.

8. A vehicle member as claimed in claim 1, wherein said second portion and said intermediate portion are formed integrally with each other to produce a unitary portion supported by said reinforcement.

9. A vehicle member as claimed in claim 5, wherein said reinforcement supports the entirety of said intermediate portion and has one end extending beyond said intermediate portion.

10. A vehicle member as claimed in claim 1, wherein said intermediate portion has a plurality of surfaces that gradually change, at least one of the gradually changing surfaces is forwardly displaced from others.

11. A vehicle member as claimed in claim 10, wherein at least one of the gradually changing surfaces has two edges branching from one of the vertexes of said second portion, wherein a coplanar surface extends along said first, second, and intermediate portions, said coplanar surfaces having at least one common edge extending along said first, second, and intermediate portions.

12. A vehicle member as claimed in claim 11, wherein said reinforcement extends beyond at least one end of the gradually changing surfaces.

13. A vehicle member as claimed in claim 12, wherein said reinforcement is located at said coplanar surface.

14. A vehicle member as claimed in claim 10, further comprising a bracket for supporting an engine and for reinforcing said gradually changing surfaces.

15. A vehicle member as claimed in claim 14, wherein said bracket is disposed in alignment with said gradually changing surfaces in the fore-and-aft direction.

16. A vehicle member as claimed in claim 14, wherein said bracket supports at least one of said gradually changing surfaces.

17. A vehicle member as claimed in claim 16, wherein said bracket is mounted to one of a plurality of mounting sites displaced on the vehicle member in the fore-and-aft direction, said plurality of mounting sites including a foremostly disposed mounting site, which has at least a part disposed on said reinforcement.

18. A vehicle member as claimed in claim 17, wherein said plurality of mounting sites include a corresponding number of fastening portions disposed on said reinforcement.

19. A vehicle member as claimed in claim 16, wherein said reinforcement has a cutout, which is covered by said bracket.

20. A vehicle member as claimed in claim 1, wherein said reinforcement is disposed inside said at least one of said first, second, and intermediate portions.

21. A vehicle member as claimed in claim 1, further including a bracket for supporting an engine, wherein said bracket reinforces said at least one of said first, second, and intermediate portions.

22. A vehicle member as claimed in claim 1, wherein said reinforcement comprises an increased thickness of the respective first, second, and intermediate portions.

23. A vehicle member as claimed in claim 1, wherein said reinforcement comprises increased rigidity of the respective first, second, and intermediate portions.

24. A vehicle member as claimed in claim 4, wherein said first portion crushes upon a compression force applied to a front end thereof with a predetermined wavelength $\lambda$ and said reinforcement has one end located at a position distanced $N\lambda/2$ from the front end of said first portion, where N is an integer greater than 1.

25. A vehicle member as claimed in claim 21, wherein said predetermined wavelength $\lambda$ is determined on the basis of a buckling waveform produced after the compression force reaches a peak thereof.

* * * * *